United States Patent [19]

Federspiel

[11] Patent Number: 5,550,752
[45] Date of Patent: Aug. 27, 1996

[54] METHOD AND APPARATUS FOR ESTIMATING THE RATE AT WHICH A GAS IS GENERATED WITHIN A PLURALITY OF ZONES

[75] Inventor: Clifford C. Federspiel, Shorewood, Wis.

[73] Assignee: Johnson Service Company, Milwaukee, Wis.

[21] Appl. No.: 279,910

[22] Filed: Jul. 25, 1994

[51] Int. Cl.$^6$ ..................................................... F24F 11/00
[52] U.S. Cl. .......................................... 364/505; 454/256
[58] Field of Search ............................. 364/505, 550, 364/557, 558, 506, 149, 150, 151; 165/22, 16, 20, 32, 28; 236/49.3, 44 R, 44 C, 94, 49.1, 49.2; 62/78, 176.6, 176.1; 454/256, 257, 258; 55/275, 274; 73/23.2, 23.24, 23.25, 29.01, 30.01, 31.01, 31.02, 31.03

[56] References Cited

U.S. PATENT DOCUMENTS

| | | | |
|---|---|---|---|
| 4,916,642 | 4/1990 | Kaiser et al. | 364/550 |
| 5,051,932 | 9/1991 | Inoue et al. | 364/550 |
| 5,119,987 | 6/1992 | Kobayashi | 236/49.3 |
| 5,170,935 | 12/1992 | Federspiel . | |
| 5,279,609 | 1/1994 | Meckler | 236/49.3 |
| 5,394,934 | 3/1995 | Rein et al. | 165/16 |
| 5,428,964 | 7/1995 | Lobdell | 62/176.6 |
| 5,464,369 | 11/1995 | Federspiel | 454/256 |

OTHER PUBLICATIONS

An Experimental Determination of Ventilation Rate in Occupied Rooms Using Atmospheric Carbon Dioxide Concentration, J. M. Penman, Building and Environment, vol. 15, pp. 45–47 (1980).

*Primary Examiner*—James P. Trammell
*Attorney, Agent, or Firm*—Harness, Dickey & Pierce, P.L.C.

[57] ABSTRACT

An apparatus for estimating the rate at which gas is generated in a plurality of zones is disclosed. It includes at least one sensor to measure values of environmental variables of at least two of the zones. Signals representative of the values are generated and provided to a gas flow model circuit. The circuit generates an estimated gas generation value, preferably of carbon dioxide, as a function of the values. The sensor preferably measures the concentration of the gas in the incoming air of the at least two zones and the concentration of the gas in the at least two zones, and may measure the concentration of the gas in the outgoing air of the at least two zones, the aggregate mass of the air in the at least two zones, or the aggregate flow of the incoming air of the at least two zones.

40 Claims, 5 Drawing Sheets

METHOD AND APPARATUS FOR ESTIMATING THE RATE AT WHICH A GAS IS GENERATED WITHIN A PLURALITY OF ZONES

FIELD OF INVENTION

The present invention relates generally to the field of building control systems, such as HVAC (heating, ventilating, and air-conditioning) systems and security systems. More particularly, the present invention relates to a method and apparatus for providing control to a building system wherein the system changes its control behavior in response to input concerning the rate at which a gas, such as carbon dioxide, is being generated within multiple enclosed spaces.

CROSS-REFERENCE TO RELATED APPLICATIONS

The present application contains subject matter similar to the subject matter of application Ser. No. 08/202,281 filed on Feb. 25, 1994 and assigned to a common owner entitled "Method and Apparatus for Estimating the Rate at which a Gas is Generated within an Enclosed Space.", U.S. Pat No. 5,464,369.

BACKGROUND OF THE INVENTION

HVAC system controllers typically control devices which affect the environment in a zone based on measurements of one or more environmental variables. A zone, or enclosed space, is an area wherein the gas concentration is assumed to be uniform. In a building, several offices are often grouped together and considered a zone. Most HVAC systems, for example, include thermostats which sense the air temperature within a zone and controllers which control the behavior of a heater or air conditioner to achieve a desired air temperature within the zone based on the air temperature measurements.

However, factors other than air temperature significantly affect an occupant's comfort and security. For example, the ventilation rate (outdoor air flow rate) of an enclosed space is an important factor in indoor air quality. In particular, ASHRAE Standard 62-1989 states that the minimum outdoor flow rate should be 15 cfm/person.

To meet this standard, buildings have been designed so that, under typical circumstances, the actual flow rate within an enclosure will meet or exceed the recommended minimum outdoor flow rate. However, without a feedback controller to guarantee a 15 cfm/person ventilation rate, the actual outdoor flow rate for any given enclosure and situation may fall below the minimum recommended outdoor flow rate. In order to implement such a controller, the number of people in a room must be accurately measured. Based on the technology available in the prior art, it has proven difficult to accurately, inexpensively and unobtrusively make such measurements. Therefore, it is clearly desirable to provide a method for unobtrusively measuring the number of people occupying a room, and an apparatus for ventilating a room based on the actual number of occupants therein.

Moreover, when the number of occupants of a room changes abruptly, the extra heat and moisture created by the occupants should be compensated for by the HVAC system. One common way to compensate for load disturbances caused by time variable occupancy is to incorporate derivative action into the controller, so that changes in the number of occupants is quickly counteracted by adjustments made in the heat supplied. The drawback of this approach is that the controller will also be sensitive to noise in the measurement of the control variable. Additionally, disturbance rejection with feedback adversely effects the stability of a system. Therefore, it is desirable to provide a method for responding to time variable occupancy in such a way as to avoid instability and noise sensitivity.

Another approach to compensate for load disturbances caused by time variable occupancy is to use the average heat generated when the room is occupied as a feed forward term. However, the actual heat generated may vary greatly from the average heat generated because the number of occupants may differ significantly from the average. Also, such a system cannot determine when a room is occupied. Accordingly, it is desirable to provide a method for compensating for time variable occupancy using a feed forward term based on the actual number of occupants.

Factors which affect an occupant's comfort include air temperature, humidity, air velocity, clothing insulation, bodily heat production rate and mean radiant temperature. A system for providing adaptive control of HVAC systems based on these six parameters is disclosed in U.S. Pat. No. 5,170,935, issued Dec. 15, 1992 to Federspiel et al., the content of which is incorporated herein by reference. Unfortunately, it is not practically possible to directly measure some of these variables.

Consequently, prior art comfort control systems have been forced to make assumptions about the variables which are otherwise too difficult to measure. For example, one prior art comfort control system simply assumes that bodily heat production is known. Another prior art system assumes that bodily heat production is unknown but constant. These limiting assumptions reduce the accuracy of thermal comfort control methods. A more accurate estimate of bodily heat production could be made by measuring the pulse rate of all of the occupants of an enclosure via pulse rate sensors strapped to their wrists. Though this pulse-monitoring method may theoretically provide a superior thermal comfort control, it is clearly impractical for most real-world situations. Thus, it is desirable to provide a practical, relatively accurate apparatus and method for determining the amount of bodily heat generated by the occupants of an enclosed space.

Some building control systems are limited to addressing the physical comfort of occupants. However, it would also be desirable to provide a building control system that addressed the emotional comfort concerns of occupants as well. One factor affecting an occupant's emotional comfort is the amount of security a room or building provides. Specifically, people feel more secure when safeguards have been taken to inhibit and/or announce the presence of intruders. One's anxiety may be lessened, for example, if he or she does not have to search for a light switch upon first entering an unlit room. Likewise, one typically feels more secure when protected by an alarm system configured to detect and announce the presence of other occupants.

Consequently, security systems have been developed which detect the presence of humans. Prior art security systems detect humans based on sound, infrared radiation, or vision. Unfortunately, each of these systems has a flaw which may be exploited by intruders. For example, security systems based on sound can fail if the intruder is quiet. Infrared security systems can fail if the intruder is shielded. Vision systems can fail if the intruder is out of view or cannot be identified by the system. In addition, vision systems are also relatively expensive. Hence, it is clearly desirable to provide a method and apparatus for detecting the presence of an occupant which does not suffer the disadvantages of the present security systems.

Although the information specific to a zone may be valuable, it may not be necessary for all applications. For example, in security applications, it may not be necessary to know in which zone there is an intruder. Knowledge that an intruder exists in some zone enclosed space within the building may be sufficient. In the case of a fire, an immediate concern is the need to evacuate the building, not necessarily the exact location of the fire. Similarly, the sensing of a toxic gas in a building is sufficient information for evacuation.

Additionally, if there is an abrupt change in temperature based on an aggregate measurement among a number of zones, this information is sufficient to have the HVAC system compensate for the load disturbances. For example, if there is a need to increase the heat in a building, the central air handling unit produces additional heat while, based on a temperature sensor in each zone, the corresponding controller and damper in the space parse the heat accordingly.

The strategy of estimating the strength of a gas source within a single zone has not been successfully applied to estimating the aggregate source strength of all zones. The application of the single-zone estimation method to a multi-zone problem is complicated by the fact that flow rates between zones must either be measured or estimated. In practical applications, these flow rates must be estimated because direct measurement of flow rates is both difficult and impractical. Different models of gas transport in buildings have been considered which allow for time-varying gas sources and time-varying flow rates between zones. Unfortunately, the number of parameters generally increase as the square of the number of zones, thereby making the system unable to quickly obtain accurate estimates of the parameters. Therefore, it is desirable to develop a measurement system such that the aggregate source strength of a gas in all zones is estimated using a method developed for estimating the source strength of a gas in a single zone with a first-order relationship.

SUMMARY OF THE INVENTION

According to one aspect of the present invention, an apparatus for estimating the rate at which carbon dioxide is generated in an enclosed space is provided. The apparatus includes a plurality of sensors. The sensors are configured to measure values of selected environmental variables in the enclosed space and generate signals representative of the values. The apparatus also includes a gas flow model circuit, operatively connected with the sensors, for receiving the signals from the sensors. The gas flow model circuit generates an estimated carbon dioxide generation rate value as a function of the values. Based on the carbon dioxide generation rate value, one may estimate whether a human is present in the enclosed space, how many humans are present in the enclosed space, and the amount of bodily heat being generated by humans in the enclosed space.

According to another aspect of the present invention, a method for determining the rate at which a gas is generated in an enclosed space is provided. The method includes the steps of measuring values of selected environmental variables in the enclosed space, and generating signals representative of the values. The method further includes the steps of transmitting the signals to a gas flow model circuit, and causing the gas flow model circuit to generate an estimated gas generation rate value as a function of the values of the selected environmental variables.

According to yet another aspect of the present invention, a building control system is provided. The building control system includes a plurality of sensors disposed to sense values of specified environmental variables in an enclosed space, and a controller, operatively connected with the plurality of sensors configured to receive the values from the plurality of sensors and generate control signals responsive to the values. The controller includes an interface circuit operatively connected with the plurality of sensors, and a gas flow model circuit operatively connected with the interface circuit. The gas flow model circuit is configured to receive the values from the plurality of sensors through the interface circuit. The gas flow model circuit is further configured to generate, responsive to the values, an estimated gas generation rate value representative of the rate at which a gas is generated in the enclosed space.

The controller further includes processing and control means operatively connected with the gas flow model. The processing and control means includes a memory. The processing and control means is configured to receive the estimated gas generation rate value from the gas flow model circuit, to process the estimated gas generation value according to instructions stored in the memory, and to generate the control signals responsive to the estimated gas generation value.

According to another aspect of the invention an apparatus for estimating the rate at which gas is generated in a plurality of zones includes at least one sensor that measures values of environmental variables of at least two of the zones. Signals representative of the values are generated and provided to a gas flow model circuit. The circuit generates an estimated gas generation value, preferably of carbon dioxide, as a function of the values. In one embodiment the sensor measures the concentration of the gas in the incoming air of the at least two zones and the concentration of the gas in the at least two zones. In an alternative embodiment the sensor also measures the concentration of the gas in the outgoing air of the at least two zones, the aggregate mass of the air in the at least two zones, or the aggregate flow of the incoming air of the at least two zones.

According to yet another aspect of the invention a method of estimating the rate at which gas is generated in a plurality of zones includes the steps of measuring values of selected environmental variables of at least two of the plurality of zones and generating an estimated gas generation rate value, preferably of carbon dioxide, as a function of the values. In a preferred embodiment the concentration of the gas in the incoming air of the at least two zones and the concentration of the gas in the at least two zones is measured. In other embodiments the concentration of the gas in the outgoing air of the at least two zones, the aggregate mass of the air in the at least two zones, or the aggregate flow of the incoming air of the at least two zones are also measured.

According to yet another aspect of the invention a building control system includes a plurality of sensors disposed to sense values of specified environmental variables in a plurality of zones. A controller is connected to the plurality of sensors, receives the values from the plurality of sensors, and generates control signals responsive to the values. The controller includes an interface circuit connected with the plurality of sensors, a gas flow model circuit connected with the interface circuit, and a processor. The gas flow model circuit is configured to receive the values from the sensors through the interface circuit, and to generate an estimated aggregate gas generation rate value representative of the rate at which a gas is generated in the zones. The processor is connected with the circuit and receives and processes the estimated gas generation rate value according to instructions stored in the memory, and generates control signals responsive to the estimated aggregate gas generation rate value.

BRIEF DESCRIPTION OF THE DRAWINGS

The features of the present invention, which are believed to be novel, are set forth with particularity in the appended claims. The invention, together with further features and advantages thereof, may best be understood by making reference to the following description taken in conjunction with the accompanying drawings, in the several figures of which like reference numerals identify like elements, and wherein:

DETAILED DESCRIPTION OF THE PREFERRED EMBODIMENT

Figure 1:
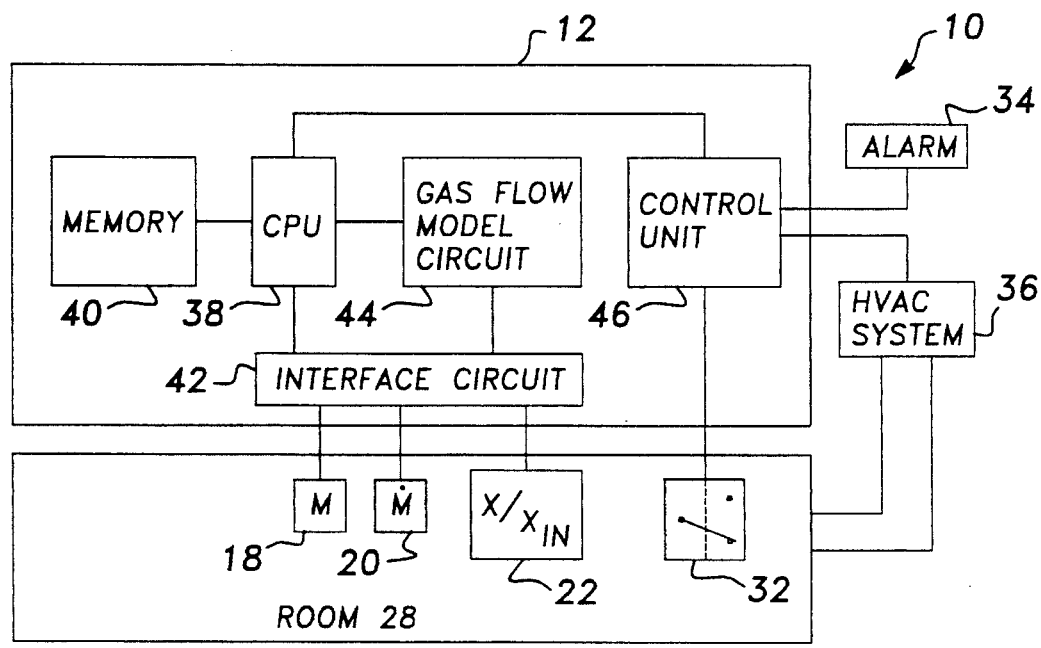
FIG. 1 illustrates in block diagram form an environmental and security control system according to the present invention.

Air is composed of a variety of gasses. The ratio of the mass of a particular gas to the total mass of the volume of air in which it is contained is referred to as the concentration of that gas in the given volume of air. When a human in an enclosed space breaths, carbon dioxide is generated. As a result of humans breathing in the enclosed space, the concentration of carbon dioxide in the enclosed space increases. The more people breathing in a room, the higher the rate of carbon dioxide generation, and the greater the rate at which the carbon dioxide concentration in the room increases. Hence, the rate at which the carbon dioxide concentration in a room increases can serve as an indication of how many people are in the room.

However, other factors also affect the rate at which the carbon dioxide concentration in a room increases. For example, air may be entering the room from the outside. If the concentration of carbon dioxide in the incoming air differs from the concentration of the carbon dioxide in the room, then the introduction of the incoming air will affect the carbon dioxide concentration in the room. The rate of change in carbon dioxide concentration in the room attributable to the incoming air depends on the concentration of carbon dioxide in the incoming air and the rate at which incoming air is entering the room. Hence, in order to accurately predict the rate at which carbon dioxide is being generated in a room, and therefore accurately estimate the amount of humans in the room, one must know more than the rate at which the carbon dioxide concentration in the room is changing.

To accurately estimate the rate at which carbon dioxide is being generated in an enclosed space, the presently preferred embodiment of the invention implements a model of the dynamics of the diffusion and convection of carbon dioxide in the enclosed space which takes into account the flow rate and carbon dioxide concentration of incoming air, as well as the rate at which the carbon dioxide concentration in the enclosed space is changing.

Various equations shall be used herein to describe the relationships between the parameters used by the model implemented in the present invention. In such equations, the following symbols and meanings shall be used:

$\dot{m}_{gen}$ is the rate at which carbon dioxide is being generated within the enclosed space;

m is the mass of carbon dioxide in the enclosed space;

$\dot{m}$ is the rate of change of the mass of carbon dioxide in the enclosed space (m);

$m_{in}$ is the mass of the carbon dioxide in the incoming air;

$\dot{m}_{in}$ is the rate of change of the mass of the carbon dioxide in the incoming air ($m_{in}$);

$m_{out}$ is the mass of the carbon dioxide in the outgoing air;

$\dot{m}_{out}$ is the rate of change of the mass of the carbon dioxide in the outgoing air ($m_{out}$);

M is the total mass of air in the enclosed space;

$M_{in}$ is the total mass of the incoming air;

$\dot{M}_{in}$ is the mass flow rate of the incoming air ($M_{in}$); and $M_{out}$ is the total mass of the outgoing air;

$\dot{M}_{out}$ is the rate at which mass is flowing out of the enclosed space.

x is the concentration of carbon dioxide in the enclosed space (m/M);

$\dot{X}$ is the time rate of change of the concentration of carbon dioxide in the enclosed space (x);

$x_{in}$ is the mass concentration of carbon dioxide in the incoming air; and $x_{out}$ is the mass concentration of carbon dioxide in the outgoing air.

The model implemented by the presently preferred embodiment of the invention assumes that:

(1) concentration distribution within the enclosed space is spatially uniform;

(2) the mass of carbon dioxide in the enclosed space is much smaller than the total mass of the enclosed space; and (3) temperature and pressure fluctuations within the enclosed space are negligible.

The model implemented by the preferred embodiment of the invention is based on the law of the conservation of mass. According to the law of the conservation of mass, the rate of change of the mass of carbon dioxide in the enclosed space ($\dot{m}$) is equal to the rate of change of the mass of the carbon dioxide in the incoming air ($\dot{m}_{in}$) minus the rate of change of the mass of the carbon dioxide in the outgoing air ($\dot{m}_{out}$) plus the rate at which carbon dioxide is being generated within the enclosed space ($\dot{m}_{gen}$). This relationship is shown in Equation 1.

$$\dot{m} = \dot{m}_{in} - \dot{m}_{out} + \dot{m}_{gen} \tag{1}$$

By dividing both sides of Equation 1 by M, Equation 1 is transformed into Equation 2.

$$\dot{x} = \frac{\dot{M}_{in}}{M} x_{in} - \frac{\dot{M}_{out}}{M} x_{out} + \frac{1}{M} \dot{m}_{gen} \tag{2}$$

Based on assumption 1 stated above, the mass concentration of carbon dioxide in the outgoing air ($x_{out}$) is equal to the concentration of carbon dioxide in the enclosed space (x). Based on assumptions 2 and 3, M is constant, and the mass flow rate of the incoming air ($\dot{M}_{in}$) equals the rate at which mass is flowing out of the enclosed space ($\dot{M}_{out}$). Incorporating these assumptions into Equation 2 yields Equation 3.

$$M\dot{x} - \dot{m}_{gen} = \dot{M}_{in}(x_{in} - x) \tag{3}$$

Thus, the rate at which carbon dioxide is being generated within the enclosed space ($\dot{m}_{gen}$) may be estimated based on the time rate of change of the concentration of carbon dioxide in the enclosed space ($\dot{x}$), the total mass of air in the enclosed space (M), the mass flow rate of the incoming air ($\dot{M}_{in}$), the mass concentration of carbon dioxide in the incoming air ($x_{in}$), and the concentration of carbon dioxide in the enclosed space (x). The mass concentration of carbon dioxide in the incoming air ($x_{in}$) and the concentration of carbon dioxide in the enclosed space (x) are typically measurable. The time rate of change of the concentration of carbon dioxide in the enclosed space ($\dot{x}$) may either be measurable or accurately approximated based on the measurements of the concentration of carbon dioxide in the enclosed space (x). Thus, Equation 3 is a linear regression on the two remaining variables, the total mass of air in the enclosed space (M) and the rate at which carbon dioxide is being generated within the enclosed space ($\dot{m}_{gen}$).

Most buildings consist of a number of interconnected enclosures, and cannot, in general, be modeled as a large, single enclosure. A gas generation rate model for multiple-enclosures is shown as Equation 4, where M is a diagonal mass matrix, x is the mass concentration state vector, $\dot{x}$ is the time rate of change for the mass concentration, $\dot{M}$ is the mass flow rate matrix, $\dot{m}_{in}$ is the mass flow vector of inlet air, $x_{in}$ is the concentration of the inlet air, and $\dot{m}_{gen}$ is the gas source strength vector.

$$M\dot{x} = \dot{M}x + \dot{m}_{in}x_{in} + \dot{m}_{gen} \tag{4}$$

The relationships expressed in Equations 3 and 4 model the gas transport dynamics in a building in continuous time. However, the preferred embodiment of the present invention implements these models on one or more programmed digital controllers. Such controllers perform operations at discrete time intervals on discrete data values. Therefore, discrete-time equivalents of these equations must be derived for digital implementation.

Many approaches for discretizing linear, continuous-time systems have been developed. This topic is covered extensively in Oppenheim, A. V. and R. W. Schafer (1989), *Discrete-Time Signal Processing*, Prentice Hall, Englewood Cliffs, N.J., and Franklin, G. F., J. D. Powell, and M. L. Workman (1990), *Digital Control of Dynamic Systems*, Addison-Wesley, Reading, Mass.

In the preferred embodiment of the invention, the concentration of carbon dioxide in the enclosed space (x) and the mass concentration of carbon dioxide in the incoming air ($x_{in}$) are sampled by a single sensor, and the discrete model shown in Equation 5 is implemented, where $\tau$ means the sampling time, n is a given time interval, n–1 is the time interval previous to n, and n–2 is the time interval previous to n–1.

$$\frac{1}{2\tau}(x(n) - x(n-2)) = \tag{5}$$

$$\frac{\dot{M}_{in}}{M}\left(x_{in}(n-1) - \frac{1}{2}(x(n) + x(n-2))\right) + \frac{1}{M}\dot{m}_{gen}(n-1)$$

The discrete model expressed in Equation 5 is similar to that which would be derived from Equation 3 using the method commonly known as Tustin's approximation, or bilinear transformation.

Using the relationships shown in Equation 5, the rate at which carbon dioxide is being generated within the enclosed space ($\dot{m}_{gen}$ at time n–1) may be estimated by a discrete-time controller based on the concentration of carbon dioxide in the enclosed space (x as measured at times n and n–2), the total mass of the air in the enclosed space (M), the mass flow rate of the incoming air ($\dot{M}_{in}$), the mass concentration of carbon dioxide in the incoming air ($x_{in}$ measured at time n–1), and the sampling time ($\tau$). Since the rate at which carbon dioxide is being generated within the enclosed space ($\dot{m}_{gen}$) is the parameter of interest, it will always be unknown. However, one or more of the other parameters of Equation 5 may also be unknown. When such is the case, the unknown parameters must be estimated in order to determine the rate at which carbon dioxide is being generated within the enclosed space ($\dot{m}_{gen}$). Several approaches to recursively estimate parameters are described in Astrom, K. and B. Wittenmark (1990), *Adaptive Control*, Addison-Wesley, Reading, Mass., Goodwin, G. C. and K. S. Sin (1984), *Adaptive Filtering Prediction and Control*, Prentice-Hall, Englewood Cliffs, 1984, and Ljung, L. and T. Soderstrom (1983), *Theory and Application of Recursive Identification*, MIT Press, Cambridge, Mass. Common estimation methods include, for example, weighted least squares methods, exponentially forgetting weighted least squares methods, covariance modification or resetting methods, and Kalman filter estimates.

Parameter estimation methods typically require the air flow model to be placed in the form shown in Equation 6.

$$y(n) = \phi^T(n)\theta \tag{6}$$

The scalar process model described in Equation 5 can be written in the form of Equation 6 three ways, depending on which parts of the model are unknown. When both the mass flow rate of the incoming air ($\dot{M}_{in}$) and the total mass of the air in the enclosed space (M) are known, Equation 5 is placed in the form shown in Equation 6 according to the relationships shown in Equations 7–9.

$$y(n) = \frac{M}{2\tau}(x(n) - x(n-2)) - \dot{M}_{in}\left(x_{in}(n-1) - \frac{x(n) + x(n-2)}{2}\right) \quad (7)$$

$$\underline{\phi}(n) = 1 \quad (8)$$

$$\underline{\theta} = \dot{m}_{gen} \quad (9)$$

When the total mass of the air in the enclosed space (M) is known but the mass flow rate of the incoming air ($\dot{M}_{in}$) is unknown, Equation 5 is placed in the form shown in Equation 6 according to the relationships shown in Equations 10–12.

$$y(n) = \frac{M}{2\tau}(x(n) - x(n-2)) \quad (10)$$

$$\underline{\phi}^T(n) = \left[\left(x_{in}(n-1) - \frac{x(n) + x(n-2)}{2}\right); 1\right] \quad (11)$$

$$\underline{\theta}^T = [\dot{M}_{in}\ \dot{m}_{gen}] \quad (12)$$

Finally, when the total mass of the air in the enclosed space (M) is unknown but the mass flow rate of the incoming air (M) is known, Equation 5 is placed in the form shown in Equation 6 according to the relationships shown in Equations 13–15.

$$y(n) = \frac{1}{2\tau}(x(n) - x(n-2)) \quad (13)$$

$$\underline{\phi}^T(n) = \left[\dot{M}_{in}\left(x_{in}(n-1) - \frac{x(n) + x(n-2)}{2}\right); 1\right] \quad (14)$$

$$\underline{\theta}^T = \left[\frac{1}{M}\ \frac{\dot{m}_{gen}}{M}\right] \quad (15)$$

Figure 4:
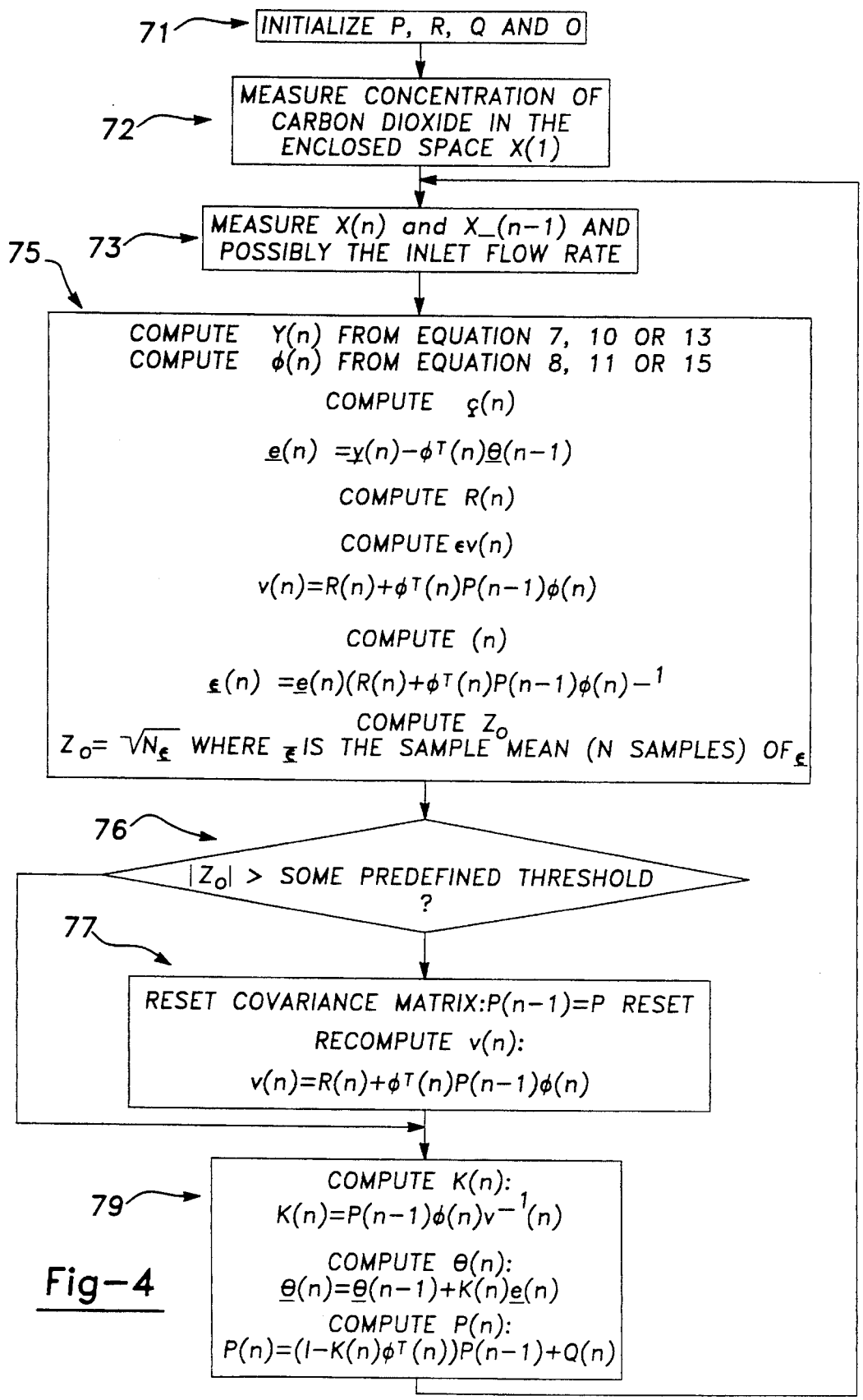
FIG. 4 is a block diagram of an algorithm for determining the rate of gas generation when parameters must be estimated.

A block diagram for one algorithm which recursively estimates unknown parameters used in the determination of the rate at which carbon dioxide is being generated within the enclosed space ($\dot{m}_{gen}$) is shown in FIG. 4. With reference to FIG. 4, n is incremented after measuring both inlet concentration and room concentration. As shown in step 71 the first step is initializing, using statistical techniques, $\hat{\underline{\theta}}$ and matrices P, R and Q, which represent a vector representing a process parameter (mass or flow rate) and the rate of $CO_2$ generation, the covariance matrix, the covariance matrix of the measurement noise, and covariance matrix of the variation of the parameters.

After the initialization is complete, the concentration of carbon dioxide in the enclosed space (x(1)) is measured, as shown by step 72. Then the mass concentration of carbon dioxide in the enclosed space and incoming air at times n and n–1, respectively (x(n), $x_{in}$(n–1)) (and the inlet flow rate in one embodiment) are measured in step 73.

Next, as shown by step 75, a number of calculations are carried out. First, y(n) is computed using one of Equations 7, 10 or 13 above. Also, $\underline{\phi}(n)$ is computed using one of Equations 8, 11 or 15 above. A computation to determine $\underline{e}(n)$, which defines the properties of innovations, based on:

$$\underline{e}(n) = \underline{y}(n) - \underline{\phi}^T(n)\hat{\underline{\theta}}(n-1) \quad (16)$$

is also carried out in step 75.

R(n), which is the covariance matrix of the prediction denoted as y(n) is computed in step 75. In accordance with the invention R(n) is a scalar which represents the square of the standard deviation of the noise in y(n). Thus, R(n) is related to the noise in the time varying concentration measurements of x(n) and $x_{in}$(n). Therefore, R(n) must be estimated continually, and is done so in the following way.

If $$\chi^{measured} = \chi^{actual} + \zeta \quad (17)$$

$$\chi_{in}^{measured} = \chi_{in}^{actual} + \zeta_{in} \quad (18)$$

then when both the mass flow rate of the incoming air ($\dot{M}_{in}$) and the total mass of the air in the enclosed space (M) are known the following equation for y(n) is true:

$$y(n) = \frac{M}{2\tau}(\chi^{actual}(n) - \chi^{actual}(n-2)) - \quad (19)$$

$$\dot{M}\left(\chi_{in}^{actual}(n-1) - \frac{1}{2}(\chi^{actual}(n) + x^{actual}(n-2))\right) +$$

$$\frac{M}{2\tau}(\zeta(n) - \zeta(n-2)) - \dot{M}\left(\zeta_{in}(n-1) - \frac{1}{2}(\zeta(n) + \zeta(n-2))\right)$$

Denoting the variances of x and $x_{in}$ as $\sigma^2$ and $\sigma_{in}^2$, respectively, then the variance of y is $$\sigma_y^2 = \frac{M_z}{\tau}\sigma^2 + \dot{M}(\sigma_{in}^2 + \sigma^2) \quad (20)$$

Since the actual values of $\sigma^2$ and $\sigma_{in}^2$ are not known and vary with time, x and $x_{in}$ are filtered using the following two equations so that only the noise is left.

$$\zeta(n) = x^{measured}(n) - 3x^{measured}(n-2) + 3x^{measured}(n-4) - x^{measured}(n-6) \quad (21)$$

$$\zeta_{in}(n-1) = x_{in}^{measured}(n-1) - 3x_{in}^{measured}(n-3) + 3x_{in}^{measured}(n-5) - x_{in}^{measured}(n-7) \quad (22)$$

This filter has the effect of stripping the trend from x and $x_{in}$. The variance of $x_{in}$ is estimated as follows:

$$\hat{\sigma}_{in}^2(n-1) = \hat{\sigma}_{in}^2(n-3) + \frac{p_{in}(n-3)}{\lambda(n-1) + p_{in}(n-3)}(\hat{\zeta}_{in}(n-1) - \hat{\sigma}_{in}^2(n-3)) \quad (23)$$

$$p_{in}(n-1) = \frac{p_{in}(n-3)}{\lambda(n) + p_{in}(n-3)} \quad (24)$$

where typical values for $\lambda$(n–1) and $p_{in}$(0) are 0.99 and 1,000,000, respectively. The initial value of the estimate of $\sigma_{in}^2$ should be a representative value for the type of sensor used. Because $\sigma^2$ jumps when the source jumps, a covariance resetting algorithm for estimating $\sigma^2$ is used. The F-statistic with 1/p(n–2) degrees of freedom is used for detecting a jump in the variance. If $\zeta$(n–1) is above the 1–$\alpha$/2 percentile of the F-distribution or below the $\alpha$/2 percentile, then p(n–2) is reset to 1.0 and the following calculation is performed:

$$\hat{\sigma}^2(n) = \hat{\sigma}^2(n-2) + \frac{p(n-2)}{\lambda(n) + p(n-2)}(\hat{\zeta}(n) - \hat{\sigma}^2(n-2)) \quad (25)$$

$$p(n) = \frac{p(n-2)}{\lambda(n) + p(n-2)} \quad (26)$$

The variance of y is estimated by substituting into Equation 20 the estimated variances of x and $x_{in}$. The same procedure can be applied to the cases when M is known but $\dot{M}_{in}$ is unknown and when M is unknown but $\dot{M}_{in}$ is known.

Additionally v(n) and $\epsilon$(n) are computed in step 75 from the following equations:

$$v(n) = R(n) + \underline{\phi}^T(n)P(n-1)\underline{\phi}(n) \quad (27)$$

$$\underline{\epsilon}(n) = \underline{e}(n)(R(n) + \underline{\phi}^T(n)P(n-1)\underline{\phi}(n))^{-1} \quad (28)$$

Finally, in step 75 $Z_0$ is computed from $\underline{Z}_0 = (\sqrt{N})\bar{\underline{\epsilon}}$ where $\bar{\underline{\epsilon}}$ is the sample mean (using N samples) of $\underline{\epsilon}$.

After the computations of step 75 are completed a test for a significant change in the parameters based on the mean, variance or auto-correlation function of innovations is performed in step 76.

If $|Z_0|$ is greater than a predefined threshold (i.e. a significant change) then the covariance matrix P is reset, as shown in step 77, where P(n−1)=P reset. After the covariance matrix is reset v(n) is recomputed using:

$$v(n) = R(n) + \underline{\phi}^T(n) P(n-1) \underline{\phi}(n) \quad (29)$$

After v(n) is recomputed the gain matrix, K(n) is computed in step 79. Also, if $|Z_0|$ was determined to be less than the predefined threshold (i.e. no significant change) then step 77 is omitted and K(n) is computed in step 79. In either case K(n) is calculated using:

$$K(n) = P(n-1) \underline{\phi}(n) v^{-1}(n) \quad (30)$$

Also in step 79 $\hat{\underline{\theta}}(n)$ and the covariance matrix P(n) are computed using the following equations:

$$\hat{\underline{\theta}}(n) = \hat{\underline{\theta}}(n-1) + K(n) \underline{\varepsilon}(n) \quad (31)$$

$$P(n) = (I - K(n) \underline{\phi}^T(n)) P(n-1) + Q(n) \quad (32)$$

After completing these computations step 73 is repeated, and new values for the mass concentration of carbon dioxide in the enclosed space and incoming air at times n and n−1, respectively (x(n), $x_{in}$(n−1)) (and the inlet flow rate in one embodiment) are measured. Thus, the unknown parameters are estimated recursively for use in determining the rate at which carbon dioxide is being generated within the enclosed space.

Referring now to FIG. 1, it illustrates in block diagram form one embodiment of a building control system 10 according to the present invention. Building control system 10 generally includes a controller 12 connected to a plurality of sensors 18, 20, and 22, each of which is disposed to measure an environmental variable within a room 28. The controller 12 is also connected to a light switch 32, an alarm 34 and an HVAC system 36.

Controller 12 generally includes a CPU 38 which is connected to a memory 40, an interface circuit 42, a gas flow model circuit 44, and a control unit 46. Interface circuit 42 is also connected to the plurality of sensors 18, 20, and 22, and to gas flow model circuit 44. Control unit 46 is connected to alarm 34, HVAC system 36, and light switch 32.

Interface circuit 42 receives signals representative of the values of environmental variables within room 28 from sensors 18, 20, and 22. Specifically, sensor 18 is configured to sense the total mass of the air in room 28 (M) and to send a signal indicative of the total mass of air within room 28 (M) to interface circuit 42. Sensor 20 is configured to sense the mass flow rate of the incoming air ($M_{in}$) and transmit a signal indicative of the mass flow rate of the incoming air ($M_{in}$) to interface circuit 42. Sensors 18 and 20 are described herein as single sensors. However, sensors 18 and 20 may measure multiple environmental variables to determine M and $M_{in}$, respectively. For example, sensor 18 may determine M based on ideal gas relationships and measurements of the nominal temperature and pressure of the air in room 28, and the measured volume of room 28. Sensors 18 and 20 are optional, in that building control system 10 may operate without one of either sensor 18 or sensor 20, since one of the values sensed by these sensors (the total mass of air within room 28 (M) or the mass flow rate of the incoming air ($\dot{M}_{in}$) may be estimated using a parameter estimation method as described above.

Sensor 22 is a mechanical multiplexing sensor and includes a low dead volume solenoid valve and is configured to sense both the concentration of carbon dioxide in room 28 (x) and the inlet mass concentration of carbon dioxide in room 28 ($x_{in}$), and to send a signal representative of these variables to interface circuit 42 at alternating time intervals. Specifically, sensor 22 is a nondispersive infrared sensor that sends a signal representative of the concentration of carbon dioxide in room 28 (x) (preferably measured at the exhaust point) to interface circuit 42 at times n=1, 3, 5 . . . , and sends a signal representative of the mass concentration of carbon dioxide in the incoming air ($x_{in}$) to interface circuit 42 at times n=0, 2, 4 . . . . While the concentration of carbon dioxide in room 28 (x) and the mass concentration of carbon dioxide in the incoming air ($x_{in}$) may alternatively be sensed with two separate sensors, use of a single sensor is preferred to reduce the cost of building control system 10 and to alleviate drift or zero errors to which many gas sensors are prone. In one embodiment a draw through configuration is used.

Interface circuit 42 processes the signals received from the sensors and converts these signals into a form usable by the gas flow model circuit 44. Interface circuit 42 may include amplifiers, anti-aliasing filters, and analog to digital converters to allow the signals from the sensors to be processed by gas flow model circuit 44.

Gas flow model circuit 44, at pre-defined time intervals, calculates a value for the rate at which carbon dioxide is being generated within the enclosed space ($\dot{m}_{gen}$) based on input from sensors 18, 20, and 22 according to the relationships expressed in Equation 3. Gas flow model circuit 44 is preferably a digital circuit, such as a processor, programmed to implement a discrete equivalent to Equation 3, such as Equation 5. The specific relationships used to implement the model expressed by Equation 3 may be either those expressed in Equations 7–9, those expressed in Equations 10–12, or those expressed in Equations 13–15, depending on whether the total mass of air within room 28 (M) and the mass flow rate of the incoming air ($\dot{M}_{in}$) are known or unknown. The general process steps for determining the rate at which carbon dioxide is being generated within room 28 ($\dot{m}_{gen}$) will be described below in greater detail with reference to FIG. 2. Once gas flow model circuit 44 has estimated the rate at which carbon dioxide is being generated within room 28 ($\dot{m}_{gen}$), gas flow model circuit 44 transmits the estimated value of the rate at which carbon dioxide is being generated within room 28 ($\dot{m}_{gen}$) to CPU 38.

CPU 38 is configured to operate in accordance with instructions it retrieves from memory 40. The operations defined by the instructions contained in memory 40 depend on the specific application to which controller 12 is put. According to one embodiment of the invention, controller 12 is part of a security system that activates an alarm when someone enters room 28. Under such circumstances, CPU 38 compares the value of the rate at which carbon dioxide is being generated within room 28 ($\dot{m}_{gen}$) to a predetermined threshold value. The predetermined threshold value is a value which reflects the expected amount of carbon dioxide generation within room 28 when room 28 is unoccupied (e.g. zero or near-zero). When the rate at which carbon dioxide is being generated within room 28 ($\dot{m}_{gen}$), as estimated by gas flow model circuit 44, is greater than the predetermined threshold value, CPU 38 sends a signal to control unit 46 to cause control unit 46 to activate alarm 34.

Alternatively, the predetermined threshold value may be a value representative of the expected carbon dioxide generation rate of a specified number of people. For example, the predetermined threshold rate may be set at (or slightly above) the expected carbon dioxide generation rate of one person. Thus configured, a person may be able to work in room 28 without causing an alarm to be activated. However, if a second individual enters room 28, the alarm will sound. In domestic environments, the threshold value may be suitably set so that an alarm is not accidentally activated by the carbon dioxide generation of pets. In other applications the predetermined threshold rate may also be set at (or slightly above) the expected carbon dioxide generation rate of multiple people so that an alarm will sound if not enough people are present in the room. Alternatively, instead of sounding an alarm, a signal could be sent to disable dangerous equipment if not enough people were in the room.

Figure 2:
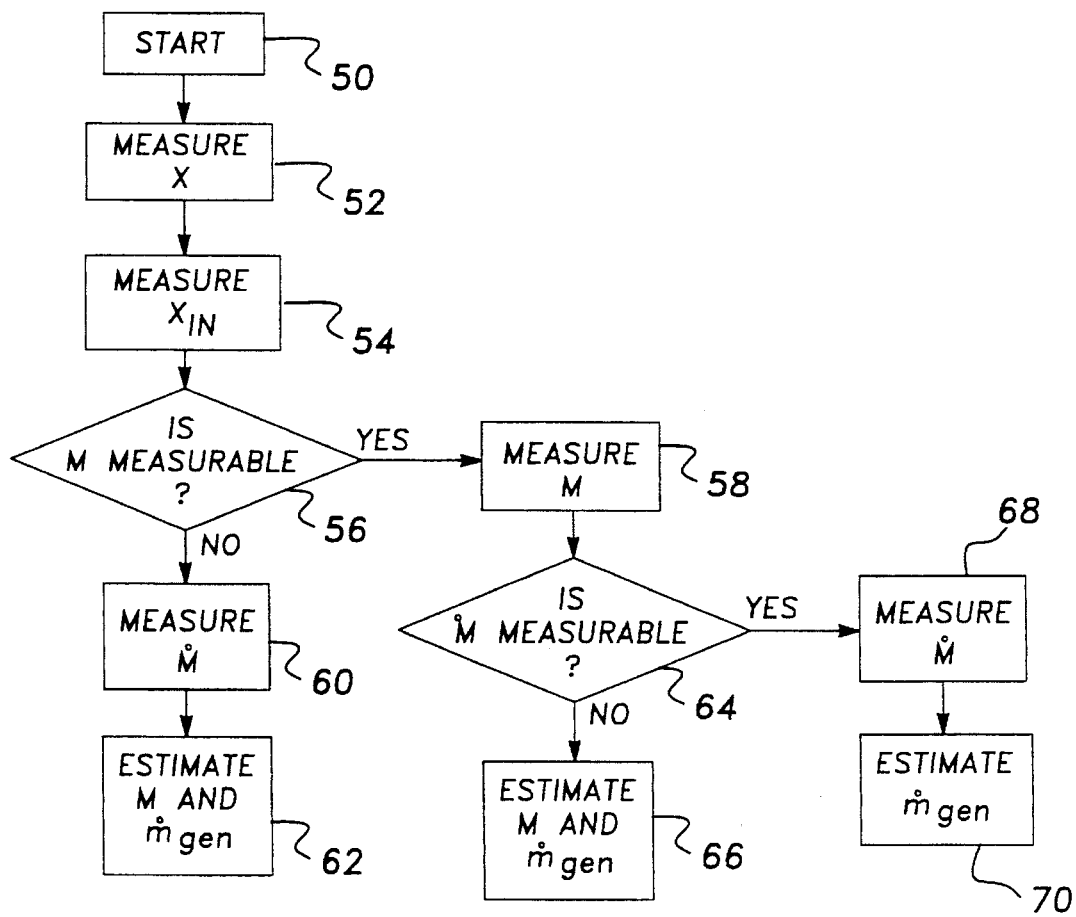
FIG. 2 is a control flow diagram illustrating the general process steps for estimating the amount of carbon dioxide generated in an enclosed space.

Referring now to FIG. 2, it illustrates a control flow diagram illustrating the general process steps for estimating the amount of carbon dioxide generated in an enclosed space. The process, initiated at block 50, is preferably performed repetitively by gas flow model circuit 44 at predefined time intervals. At block 52, the concentration of carbon dioxide in the enclosed space (x) is measured. At block 54, the mass concentration of carbon dioxide in the incoming air ($x_{in}$) is measured. While FIG. 2 shows the concentration of carbon dioxide in the enclosed space (x) and the mass concentration of carbon dioxide in the incoming air ($x_{in}$) being measured sequentially, these values are preferably measured at alternating time intervals, as described above.

At block 56, it is determined whether the total mass of air within the enclosed space (M) is measurable (i.e. whether the system implementing the process includes a sensor for acquiring data indicative of M). If the total mass of air within the enclosed space (M) is not measurable, the mass flow rate of the incoming air ($\dot{M}_{in}$) is measured at block 60, and the total mass of air in the enclosed space (M) and the rate at which carbon dioxide is being generated within the enclosed space ($\dot{m}_{gen}$) are estimated at block 62. Since the total mass of air in the enclosed space (M) is unknown, the total mass of air in the enclosed space (M) and the rate at which carbon dioxide is being generated within the enclosed space ($\dot{m}_{gen}$) are preferably estimated based on the relationships expressed in Equations 13–15.

If the total mass of air in the enclosed space (M) is measurable, then control proceeds from block 56 to block 58, where the total mass of air in the enclosed space (M) is measured. At block 64, it is determined whether the mass flow rate of the incoming air ($\dot{M}_{in}$) is measurable.

If the mass flow rate of the incoming air ($\dot{M}_{in}$) is not measurable, control passes to block 66, where the mass flow rate of the incoming air ($\dot{M}_{in}$) and the rate at which carbon dioxide is being generated within the enclosed space ($\dot{m}_{gen}$) are estimated. Since the mass flow rate of the incoming air ($\dot{M}_{in}$) is unknown, the mass flow rate of the incoming air ($\dot{M}_{in}$) and the rate at which carbon dioxide is being generated within the enclosed space ($\dot{m}_{gen}$) are preferably estimated based on the relationships expressed in Equations 10–12. If the mass flow rate of the incoming air ($\dot{M}_{in}$) is measurable, the mass flow rate of the incoming air ($\dot{M}_{in}$) is measured at block 68, and the rate at which carbon dioxide is being generated within the enclosed space ($\dot{m}_{gen}$) is estimated at block 70. Since both the total mass of air in the enclosed space (M) and the mass flow rate of the incoming air ($\dot{m}_{in}$) have been measured prior to block 70, the rate at which carbon dioxide is being generated within the enclosed space ($\dot{m}_{gen}$) is estimated based on the relationships expressed in Equations 7–9.

Referring again to FIG. 1, according to another embodiment of the invention, CPU 38 compares the value of the rate at which carbon dioxide is being generated within room 28 ($\dot{m}_{gen}$) to the predetermined threshold value indicative of an unoccupied room, as described above, but rather than activate an alarm, CPU 38 controls the lighting within room 28 responsive to the outcome of the comparison. Specifically, when the previous estimate of the rate at which carbon dioxide is being generated within room 28 ($\dot{m}_{gen}$) was below the threshold, and the current estimate is above the threshold, then someone has just entered room 28. When this occurs, CPU 38 sends a signal to control unit 46 to cause control unit 46 to activate light switch 32. Consequently, when a human enters unoccupied room 28, the lighting in the room will turn on. CPU 38 continues to compare the repetitively generated estimated rate at which carbon dioxide is being generated within room 28 ($\dot{m}_{gen}$) to the threshold value at predetermined intervals. The rate at which carbon dioxide is being generated within room 28 ($\dot{m}_{gen}$) will again fall below the predetermined threshold when the last occupant of room 28 exits room 28. When CPU 38 determines that the present rate at which carbon dioxide is being generated within room 28 ($\dot{m}_{gen}$) is below the threshold value, when the previous rate at which carbon dioxide was generated within room 28 ($\dot{m}_{gen}$) was above the threshold value, CPU 38 sends a signal to control unit 46 to cause control unit 46 to deactivate light switch 32, causing the lights in room 28 to go off. In this embodiment of the invention, humans are saved the hassle and inconvenience of searching for light switches in unlighted rooms. In addition, substantial energy savings may be realized, since humans often fail to turn off the lights in a room when they exit.

According to another embodiment of the invention, switch 32 may control power to devices other than lights. For example, switch 32 may control power to one or more computer monitors within room 28. Thus configured, when a human is present in room 28, the monitors are activated, and when no humans are in room 28, the monitors are shut off. The particular devices controlled by switch 28 may therefore vary according to the specific requirements of each user and application.

According to yet another embodiment of the invention, CPU 38 divides the rate at which carbon dioxide is being generated within room 28 ($\dot{m}_{gen}$) by a value representative of the expected carbon dioxide generation rate of an average human. This yields a value indicative of the number of people currently occupying room 28. CPU 38 transmits this value to control unit 46. According to this embodiment, control unit 46 is configured to control HVAC system 36 according to a predetermined control strategy responsive to, among other factors, the number of people within room 28. Depending on the specific control strategy implemented by control unit 46, control unit 46 may be connected to sensors and interfaces not shown in FIG. 1.

The actual carbon dioxide generation rate of a person will vary based on factors such as the size of and activity level of the person. Therefore, the expected carbon dioxide generation rate per person may be chosen based on the expected use of the room. For example, if it is expected that people will be standing in the room, the rate of $1.0 \times 10^{31.5}$ kg/s may be used, which rate represents the rate at which an average person generates carbon dioxide while standing.

To determine the value indicative of the number of people currently occupying room 28, CPU 38 may alternatively divide the rate at which carbon dioxide is being generated within room 28 ($\dot{m}_{gen}$) by a value representative of the lower bound rate at which a single human generates carbon dioxide. The resulting estimate will reflect the maximum possible number of people presently occupying room 28. This conservative method of estimating the number of people in room 28 is preferable when, for example, a minimum ventilation rate per person must be guaranteed.

Control unit 46 is a controller configured to control HVAC system 36 according to a predetermined control strategy. For example, control unit 46 may be configured to receive the signal indicative of the number of occupants in room 28, and to generate a control signal based on this number to cause HVAC system 36 to ventilate room 28 at an optimal outdoor flow rate. As mentioned above, the ASHRAE Standard 62-1989 states that the minimum outdoor flow rate should be 15 cfm/person. Because the present invention is able to estimate the number of people occupying room 28, this standard can be met through direct control, rather than simply through design based on occupancy assumptions.

In one embodiment of the present invention a temperature control system utilizing the above-described method and/or apparatus to determine the number of occupants in a room may be utilized with a control system to provide a feed forward calculation to compensate for the heat and/or humidity generated by the occupants.

Figure 3:
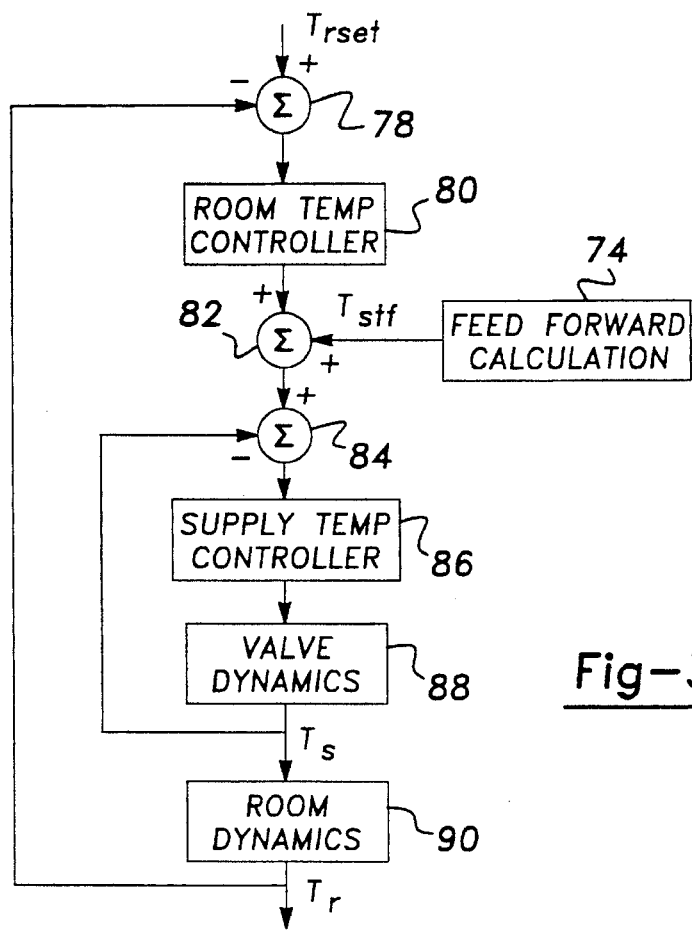
FIG. 3 is a schematic diagram of a room temperature control system for a constant volume system with reheat utilizing the feed forward calculation of the present invention.

Referring now to FIG. 3, a schematic diagram of a room temperature control for a constant volume system with reheat is shown. A desired temperature ($T_{rset}$) is provided as an input along with a supply temperature feed forward input ($T_{sff}$). The system senses the supply temperature ($T_s$) and room temperature ($T_r$). $T_r$ is subtracted from $T_{rset}$ at a summer 78. The feedback including $T_r$ rejects slowly varying load disturbances caused by diurnal changes in outdoor conditions and time varying loads in adjoining rooms.

The signal from summer 78 is provided to a room temperature controller 80, which outputs a signal indicative of the difference from summer 78. The output of room temperature controller 80 is summed with $T_{sff}$ at a summer 82 to provide a control signal which accounts for both the diurnal changes described above and the changes due to time variance in the number of occupants. As will be described below, the feed forward term ($T_{sff}$) compensates for abrupt changes in the number of occupants.

The output of summer 82 is provided to a summer 84 where $T_s$ is subtracted. Feedback of $T_s$ is provided to linearize the nonlinear behavior of the reheat valve. The output of summer 84 is provided to a supply temperature controller 86 which outputs a signal to control the reheat valve. A box 88 represents the valve dynamics, which include the non-linearities corrected for by feeding back $T_s$.

The output of valve dynamics box 88, $T_s$, is provided to a box 90 which represents the room dynamics. The output of box 90, $T_r$, is the temperature of the room, and is fed back to summer 78.

As stated above, the feed forward term ($T_{sff}$) compensates for abrupt changes in the number of occupants. The feed forward component of the supply temperature, $T_{sff}$, is $$T_{sff} = -\frac{Q_{ff}}{\dot{M} C_p} \quad (33)$$

where $Q_{ff}$ is the estimated convective heat transfer from the occupants, $\dot{M}$ is the mass flow rate, and $C_p$ is the specific heat of air at constant pressure. The number of occupants may be calculated as described above.

The value of $Q_{ff}$ is obtained from a model-based filter of the carbon dioxide measurements at the room inlet and outlet points. The following equation shows the relation between the carbon dioxide source strength and $Q_{ff}$ when it is assumed that the air flow is constant and the mean radiant temperature is equal to the air temperature:

$$Q_{ff} = 3.36 \times 10^6 \dot{m}_{gen} \quad (34)$$

where $Q_{ff}$ is in watts, $\dot{m}_{gen}$ is in kg/s, the respiratory quotient (defined as the ration of carbon dioxide produced to oxygen consumed) is assumed to be 0.83, the ratio of sensible to latent heat generated by occupants is assumed to be 1.36, and the ratio of radiative to convective heat transfer is assumed to be 1.14. The ratio of radiative to convective heat transfer can be more accurately determined if the air flow rate and/or the mean radiant temperature is measured.

Combining the equation giving $T_{sff}$ and $Q_{ff}$ above, the feed forward component of the supply temperature is $$T_{sff} = 3.34 \times 10^3 \ast \frac{\dot{m}_{gen}}{\dot{M}} \quad (35)$$

where $T_{sff}$ is in degrees celsius. The resulting value is used in a control system such as that of FIG. 3.

According to yet another embodiment of the invention, control unit 46 may be a controller configured to implement an adaptive control strategy based on the strategy described in U.S. Pat. No. 5,170,935. The adaptive control strategy described in U.S. Pat. No. 5,170,935 is responsive to, among other things, the bodily heat production within an enclosed space. Typically, bodily heat production must be estimated, since it would be extremely difficult and impractical to measure directly. In general, when one is active, one generates more heat and breaths harder. Conversely, when one is less active, one generates less heat and breaths less hard. Thus, the bodily heat production of an individual varies proportionally with the rate at which the individual is generating carbon dioxide. Hence, CPU 38 estimates the bodily heat production within room 28 based on the rate at which carbon dioxide is being generated within the enclosed space ($\dot{m}_{gen}$) and the number of people within room 28. In this embodiment of the invention, the actual number of people within room 28 must either be assumed, directly entered into CPU 38 through a user interface (not shown), or estimated by a method which is not based upon rate at which carbon dioxide is being generated within the enclosed space ($\dot{m}_{gen}$)

As is evident from the foregoing description, the present invention provides an apparatus and method for detecting the presence and number of humans in an enclosed space based on the amount of carbon dioxide being generated in the enclosed space. According to one aspect of the invention, the carbon dioxide generation rate is used to detect the presence of an intruder. Upon the detection of an intruder, an alarm is activated Alternately, other suitable actions may be taken, such as energizing a light on a security control panel.

According to another aspect of the invention, the estimated carbon dioxide generation rate is used to detect when a person enters an unoccupied room, and when the last person to occupy a room leaves the room. Upon detection that a person is entering an unoccupied room, the lights in the room are activated. Upon detection that the last person in a room has left the room, the lights in the room are deactivated.

According to another aspect of the invention, the estimated carbon dioxide generation rate and the number of people in a room are used to estimate the bodily heat production within the room. The bodily heat production estimation may then be used to determine and control the overall thermal comfort of the occupants in the room.

According to yet another aspect of the invention, the estimated carbon dioxide generation rate is used to estimate the number of people in a room to control the ventilation rate in the room. Thus, a minimum outdoor flow rate may be maintained without reliance on occupancy assumptions.

Information specific to a single zone may not be necessary or sufficient for all applications. The use of the above-described single zone gas source estimation strategy could be applied to a building with multiple zones if there was a first-order relationship for identifying the aggregate process and/or source parameters of a multi-zone system from measured data. Generally, however, first-order models are insufficient to completely describe gas transport in a building.

The present invention includes a single-sensor system for identifying the aggregate parameters of gas transport in a building based on a first-order relationship which is derived using the fact that mass conservation imposes a certain characteristic on the state-variable description of the process. Conditions for a strict equivalence to a single-zone system are too restrictive to be widely applicable. Therefore, an alternative first-order relationship is derived.

Various equations shall be used herein to describe the relationships between the parameters used by the model implemented in the present invention. In such equations, the following symbols and meanings shall be used:

| Single-Zone Notation | Multi-Zone Notation | Definition / Type |
| --- | --- | --- |
| | c | Output distribution vector for a single output system / Row Vector |
| | C | Output distribution matrix / Matrix |
| $\dot{M}$ | F(t) | Air mass flow rate matrix / Matrix |
| | $f_{ij}(t)$ | Mass flow rate of air from zone j to zone i; / Scalar |
| $\dot{M}_{in}$ | $f_{in}(t)$ | Mass flow rate of air into a zone / Scalar |
| | $f_{io}(t)$ | Mass flow rate of air from zone i to the outdoors / Scalar |
| | $f_o(t)$ | Vector of mass flow rates from outdoors to each zone / Column Vector |
| | $f_{oi}(t)$ | Mass flow rate of air from zone i to outdoors / Scalar |
| $\dot{M}_{out}$ | $f_{out}(t)$ | Mass flow rate of air out of a zone /Scalar |
| | K | Number of system outputs / Scalar |
| | M | Mass matrix / Matrix |
| M | $M_i$ | Mass of the $i^{th}$ zone / Scalar |
| $\dot{m}$ | $\dot{m}_z(t)$ | Time rate of change of the mass of a gas species / Scalar |
| M | $M_z$ | Mass of a zone / Scalar |
| | N | Dimension of the state vector / Scalar |
| $\dot{M}_{gen}$ | r(t) | Gas species generation rate / Scalar |
| $\dot{M}_{gen}$ | r(t) | Vector of gas species generation rates for each zone / Column Vector |
| | $r_i(t)$ | Gas species generation rate in the $i^{th}$ zone; also $i^{th}$ element of vector r(t) / Scalar |
| | $S_i(t)$ | Sum of the air flow rates entering or leaving zone i / Scalar |
| | v | N-dimensional vector of ones divided by the total mass / Row Vector |
| $\dot{M}_{in}$ | $w_{in}(t)$ | Mass flow rate of a gas species into a zone / Scalar |
| $\dot{M}_{out}$ | $w_{out}(t)$ | Mass flow rate of a gas species out of a zone / Scalar |
| | y(t) | Concentration for a single-output system / Scalar |
| | y(t) | Vector of concentration measurements / Column Vector |
| | z(t) | Mass concentration in the return duct / Scalar |
| x(t) | $\omega(t)$ | Mass concentration state vector / Column Vector |
| $\dot{x}(t)$ | $\dot{\omega}(t)$ | Time rate of change of mass concentration state vector / Column Vector |
| x(t) | $\omega_i$ | Mass concentration of the $i^{th}$ zone / Scalar |
| $\dot{x}(t)$ | $\dot{\omega}_i$ | Time rate of change of mass concentration of the ith zone / Scalar |
| $x_{in}$ | $\omega_{in}(t)$ | Mass concentration of air flowing into a zone / Scalar |
| $x_{in}$ | $\omega_o(t)$ | Mass concentration of outdoor air / Scalar |
| $x_{out}$ | $\omega_{out}(t)$ | Mass concentration of air flowing out of a zone / Scalar |
| x(t) | $\omega_z(t)$ | Zone mass concentration / Scalar |
| $\dot{x}(t)$ | $\dot{\omega}_z(t)$ | Time rate of change of zone mass concentration / Scalar |

The model of the transport of a gas species in air are based on conservation of mass for a pre-defined set of control volumes (or zones). The model implemented by the preferred embodiment of the invention assumes that:

A1 The mass of the air in each zone is constant.

A2 The concentration distribution in each zone is spatially uniform.

A3 The gas species is transported by bulk movement of the air rather than by diffusion.

In Assumption A1, the air contains both the gas species and the other components of air such as nitrogen and oxygen.

Figure 5:
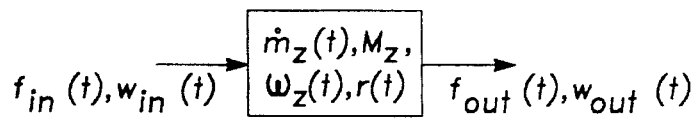
FIG. 5 is a schematic diagram of a single-zone system.

FIG. 5 is a schematic diagram of a single-zone system. From conservation of air mass $$\dot{M}_z(t) = f_{in}(t) - f_{out}(t) \tag{36}$$

where $\dot{M}_z(t)$ is the time rate of change of the mass of air in the zone, $f_{in}(t)$ is the mass flow rate of air entering the zone, and $f_{out}(t)$ is the mass flow rate of air leaving the zone. Under Assumption A1

$$\dot{M}_z(t) = 0 \tag{37}$$

or equivalently $$f_{in}(t) = f_{out}(t) \tag{38}$$

From conservation of the mass of the gas species $$\dot{m}_z(t) = w_{in}(t) - w_{out}(t) + r(t) \tag{39}$$

where $\dot{m}_z(t)$ is the time rate of change of the mass of the gas species in the zone, $w_{in}(t)$ is the mass flow rate of the gas species into the zone, $w_{out}(t)$ is the mass flow rate of the gas species out of the zone, and r(t) is the rate at which the gas species is generated within the zone. Under Assumptions A2 and A3, Equation 39 can be written as an ordinary differential equation in terms of the inlet, outlet, and zone concentrations as follows $$\frac{d}{dt}(M_z(t)\omega_z(t)) = f_{in}(t)\omega_{in}(t) - f_{out}(t)\omega_{out}(t) + r(t) \tag{40}$$

Using the dot notation for the time derivative, Equation 40 becomes $$\dot{M}_z(t)\omega_z(t) + M_z(t)\dot{\omega}_z(t) = f_{in}(t)\omega_{in}(t) - f_{out}(t)\omega_{out}(t) + r(t) \tag{41}$$

Also by Assumption A2

$$\omega_{out}(t) = \omega_z(t) \tag{42}$$

Substituting Equations 37, 38, and 42 into Equation 41 gives $$\dot{\omega}_z(t) = \frac{f_{in}(t)}{M_z}(\omega_{in}(t) - \omega_z(t)) + \frac{1}{M_z} r(t) \quad (43)$$

which is a linear, time-varying (LTV) scalar system.

In prior systems, imperfect mixing within a zone is modeled by assuming that the zone mass is time-varying. In that case, the single-zone model must contain the term $\dot{M}_z(t)\omega_z(t)$.

Non-uniform conditions in buildings may be treated by modeling the building as a number of interconnected, single-zone systems of the type described above. These models allow for time-varying gas sources and time-varying flow rates between zones.

Figure 6:
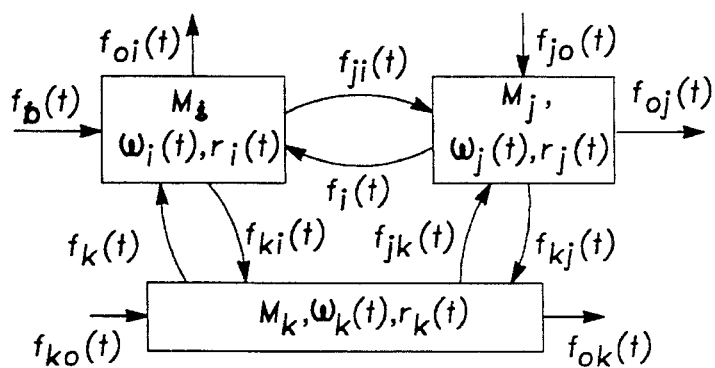
FIG. 6 is a schematic representation of a multi-zone system showing the control volumes of individual zones and the air flows into and out of zones.

FIG. 6 is a schematic representation of a multi-zone system showing the air flows into and out of zones. The interconnections are assumed to be one-way flow passages. Therefore, the flow variables are always positive. By applying conservation of mass to each zone and using the same assumptions that were used to develop the above-described single-zone model, a multi-zone model of the process is constructed. The mass conservation equation for one zone of the multi-zone process is $$M_i \dot{\omega}_i(t) = \sum_{j=1}^{N} f_{ij}(t)\omega_j(t) - \left(\sum_{j=1}^{N} f_{ij}(t)\right)\omega_i(t) - f_{oi}(t)\omega_i(t) + f_{io}(t)\omega_o(t) + r_i(t) \quad (44)$$

where $M_i$ is the mass of the $i^{th}$ zone, $\omega_i(t)$ is the mass concentration of the $i^{th}$ zone, N is the number of zones, $f_{ij}(t)$ is the flow of air from the $j^{th}$ zone to the $i^{th}$ zone ($f_{ii}=0$), $f_{oi}(t)$ is the flow of air from the $i^{th}$ zone to the outdoors, $f_{io}(t)$ is the flow of air from the outdoors to the $i^{th}$ zone, $\omega_o(t)$ is the mass concentration of the outdoor air, and $r_i(t)$ is the gas generation rate in the $i^{th}$ zone.

Figure 7:
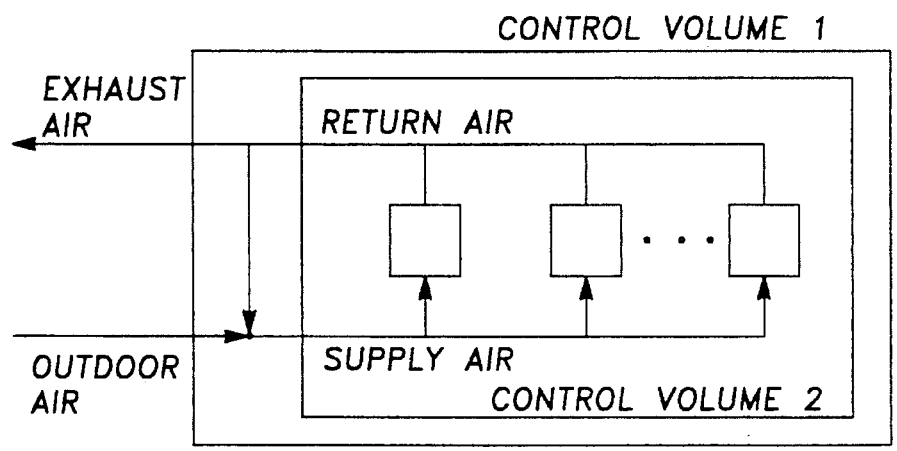
FIG. 7 is a schematic diagram of a ventilation system showing recirculation.

In many mechanically ventilated systems, outdoor air is mixed with return air before it is supplied to the zones as is illustrated in FIG. 7. The common definitions of supply, return, and exhaust air are shown. Note that with Control Volume 1, $\omega_o$ refers to the outdoor air concentration, while for Control Volume 2, $\omega_o$ may be redefined as the supply air concentration. When $\omega_o$ is defined with respect to Control Volume 1, then the quantity $f_{ji}$ may have two parts. One part may be due to air flowing directly from zone i to zone j, say through a doorway. The other part may be due to recirculation. These two parts should be consolidated in the model of the process. In other words, the effect of recirculation is to induce flow between zones that might not otherwise occur. However, the general mathematical description of the process dynamics is not altered by recirculation when transport delays in the air ducts are negligible.

The state-variable description of the set of mass conservation equations (44) is $$M\dot{\omega}(t) = F(t)\omega(t) + f_o(t)\omega_o(t) + r(t) \quad (45)$$

where $$M = \begin{bmatrix} M_1 & 0 & \cdots & 0 \\ 0 & M_2 & \cdots & \cdot \\ \cdot & \cdot & \cdots & \cdot \\ \cdot & \cdot & \cdots & \cdot \\ \cdot & \cdot & \cdots & \cdot \\ 0 & 0 & \cdots & M_N \end{bmatrix} \quad (46)$$

$$F(t) = \begin{bmatrix} -S_1(t) & f_{12}(t) & \cdots & f_{1N}(t) \\ f_{21}(t) & -S_2(t) & \cdots & f_{2N}(t) \\ \cdot & \cdot & \cdots & \cdot \\ \cdot & \cdot & \cdots & \cdot \\ \cdot & \cdot & \cdots & \cdot \\ f_{N1} & f_{N2}(t) & \cdots & -S_n(t) \end{bmatrix} \quad (47)$$

$$S_i(t) = \sum_{j=1}^{N} f_{ji}(t) + f_{oi}(t) \quad (48)$$

$$= \sum_{j=1}^{N} f_{ij}(t) + f_{io}(t)$$

and where $\omega(t)$ is the mass concentration state vector, $f_o(t)$ is the vector of outdoor air flow to each zone, $\omega_o(t)$ is the outdoor air concentration, and $r(t)$ is the source vector. Note that transport delays caused by air movement through ducts have been neglected.

In relation to $F(t)$, the $i^{th}$ column sum of matrix $F(t)$ is equal to the negative of the flow from the $i^{th}$ zone to the outdoors:

$$\sum_{j=1}^{N} F_{ji}(t) = -f_{oi}(t) \quad (49)$$

Equation 49 is a direct result of the conservation of mass for each control volume.

The inputs to the multi-zone process are the sources in each zone and the supply to each zone. The outputs of the process are gas concentration measurements, which may be taken at some physical point in the process including a recirculation duct. Such measurements can be expressed as a weighted average of the state variables.

$$y(t) = c(t)\omega(t) \quad (50)$$

where $C(t)$ is a K×N matrix, K being the number of outputs. For example, if the $j^{th}$ measurement is the concentration of the $i^{th}$ zone, then the $i^{th}$ element of the $j^{th}$ row of $C(t)$ is one, and all other elements of the $j^{th}$ row are zero. However, if the $j^{th}$ measurement is the return concentration, then the $i^{th}$ element of the $j^{th}$ row of $C(t)$ is the ratio of the return air flow rate from the $i^{th}$ zone to the total return air flow rate.

From Equations 45 and 50, one can see that the state-variable description of the multi-zone ventilation system consists of a set of N first-order differential equations and K algebraic equations.

An alternative mathematical description of the multi-zone gas mixing process is the input-output description. The input-output description of a system may be in the form of a differential equation, an integral equation, or a transfer function. The most common type of input-output description is a differential equation.

The input-output description can be derived from the state-variable description. For example, consider the system shown schematically in FIG. 8 which is a schematic diagram of a two-zone system. If the output is $\omega_2(t)$, then the parameters of the state variable description of the process are $$M = \begin{bmatrix} 30 & 0 \\ 0 & 50 \end{bmatrix} \quad (51)$$

and the measurement equation is $$F(t) = \begin{bmatrix} -0.09 & 0 \\ 0.03 & -0.1 \end{bmatrix} \quad (52)$$

-continued $$f_o(t) = \begin{bmatrix} 0.09 \\ 0.07 \end{bmatrix} \quad (53)$$

$$y(t) = \begin{bmatrix} 0 & 1 \end{bmatrix} \begin{bmatrix} \omega_1(t) \\ \omega_2(t) \end{bmatrix} \quad (54)$$

Differentiating Equation 54 once and substituting y(t) for $\omega_2(t)$ gives $$\dot{y}(t) = \frac{0.0006\omega_1(t) - 0.002y(t)}{+0.0014\omega_o(t) + 0.02r_2(t)} \quad (55)$$

Differentiating again, substituting for $\omega_1(t)$, and collecting terms gives $$\ddot{y}(t)+0.005\dot{y}(t)+6\times10^{-6}\, y(t)=0.0014\dot{\omega}_o(t)+6\times10^{-6}\omega_o(t)+2\times10^{-5}r_1(t)+ 0.02\dot{r}_2(t)+6\times10^{-5}r_2(t) \quad (56)$$

In this example, the order of the input-output description is two, the same as the dimension of the state vector.

It is necessary to determine when a first-order model may be used to identify aggregate process and/or source parameters of a multi-zone system. Certainly such an identification problem can be solved if there exists an input-output description that is strictly equivalent to a single-zone system with process parameters equal to the aggregate process parameters of the multi-zone system, and with a source equivalent to the aggregate source of the multi-zone system. However, from the point of view of the identification of aggregate parameters, it is not necessary that the input-output description be strictly equivalent to that of a single-zone system. All that is required is that a first-order differential equation relates aggregate process parameters and the aggregate source strength to measurable process variables.

There are two first-order relationships which model the multi-zone system. First, sufficient conditions for inducing a first-order input-output description of a multi-zone process that is strictly equivalent to that of a single-zone process are derived. The physical interpretation of these conditions reveals that they are highly restrictive. Therefore, a second set of sufficient conditions are derived in which the input-output relationship is first-order, but not strictly equivalent to that of a single-zone system.

Sufficient conditions for the input-output description of a single output system (K=1) to be first order and strictly equivalent to a single-zone system include the following conditions.

Let Equations 45 and 50 describe the transport of a gas species in an N-dimensional, single-output system. Then the input-output description of the system is $$\dot{y}(t) = \frac{\bar{f}(t)}{\bar{M}} (\omega_o(t) - y(t)) + \frac{1}{\bar{M}} \bar{r}(t) \quad (57)$$

if the following conditions are true:

$$c_i = \frac{M_i}{\bar{M}} \quad (58)$$

$$f_{oi}(t) = \frac{\bar{f}(t)}{\bar{M}} M_i \quad (59)$$

where $$\bar{f}(t) = \sum_{i=1}^{N} f_{oi}(t) \quad (60)$$

$$\bar{M} = \sum_{i=1}^{N} M_i \quad (61)$$

$$\bar{r}(t) = \sum_{i=1}^{N} r_i(t) \quad (62)$$

In this embodiment of the present invention based on Equation 57, measurements are taken of the concentration of gas in the incoming air of at least two of the zones and the concentration of gas in at least two of the zones. By Assumption 1, the mass of air in each zone is assumed to be constant. As expressed in Equation 61, the aggregate mass is either known or estimated. The aggregate flow parameter expressed in Equation 60 is also known or estimated. If the aggregate flow varies with time, it can also be measured.

The first condition (Equation 58) implies that the output is the air-mass-weighted average of the concentration in all of the zones, normalized by the total air mass. In other words, the contribution of the $i^{th}$ zone to the output is the fraction of the total mass in the $i^{th}$ zone. This condition involves only the measurement, so it will be referred to as the measurement condition.

The second condition (Equation 59) implies that the air flow rate from each zone to the outdoors is proportional to the air mass of the zone, and that the proportionality constant is the same for all zones. This condition affects the design of the ventilation system, so it will be referred to as the design condition.

If these two conditions hold, then the input-output description of the multi-zone process is the same as that for an equivalent single-zone process in which the source is the aggregate of the sources in the multi-zone system, the inlet flow rate is the aggregate of the flow rates from all zones, and the mass is the aggregate of the masses of the multi-zone system.

These conditions, however, are not necessary. Consider a two-zone system that is composed of two identical, decoupled single-zone systems. If the inputs are both zero, and if the output is the concentration in just one of the zones, then the system satisfies the design condition, but violates the measurement condition. However, the input-output description is the same as the input-output description of the aggregate system because the ratio of the aggregate flow to the aggregate mass is the same as the ratio of the flow in one zone to the mass of that zone.

There are some physical implications of these conditions. The first two observations involve restrictions on the design and type of ventilation systems. They are both results of the second condition. The third observation states that the conditions do not make a multi-zone system a single-zone system. The fourth observation describes a restriction on the measurement system, and is a result of the first condition.

1. If a system satisfies the conditions and if there is no exfiltration, then there is a return path from each zone. This fact is a direct result of Condition 2. The implication is that the design of many mechanically ventilated systems may violate the conditions because it is common for the number of return points to be less than the number of zones.

2. The time-varying systems that satisfy the conditions have return flow rates from each zone that vary proportionally. This fact is also a result of Condition 2. The implication is that, under normal, occupied operation, variable-air-volume (VAV) systems will never satisfy the conditions because the supply flow from each zone (and therefore the return flow) is dependent on the thermal load in the zone, which may be independent of the thermal loads in other zones.

3. Although Condition 2 places constraints on the way in which the air must be mixed, it does not constrain a multi-zone system to be a single, uniformly-mixed chamber. In other words, the zone concentrations of systems that satisfy the conditions are not necessarily equal. Since this fact may be counter-intuitive given that the input-output relationship is first order (i.e., like that of a single-zone system), it is demonstrated with an example.

Figure 8:
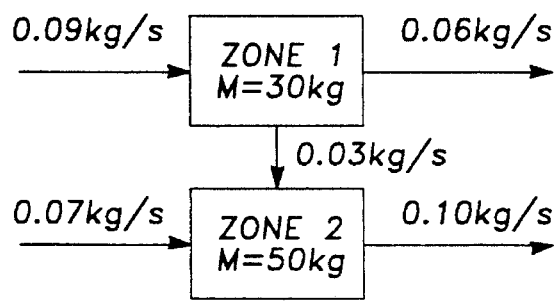
FIG. 8 is a schematic diagram of a two-zone system.

Again consider the above-described process illustrated schematically in FIG. 8. If the output is the return concentration rather than the concentration of zone 2, then $$c = \begin{bmatrix} \frac{3}{8} & \frac{5}{8} \end{bmatrix} \quad (63)$$

Calculations reveal that this system satisfies both conditions (Equations 58 and 59). When $$\omega_o(t) = \omega_o \quad (64)$$

$$\omega(0) \neq [\omega_o \ \omega_o]^T \quad (65)$$

$$r(t) = [0 \ 0]^T \quad (66)$$

the solution to the state equation is $$\omega(t) = \begin{bmatrix} e^{-0.003t}\omega_1(0) + \omega_o(1 - e^{-0.003t}) \\ \dots \\ 0.6(e^{-0.002t} - e^{-0.003t}\omega_1(0) + \\ e^{-0.002t}\omega_2(0) + \omega_o(1 - 1.6e^{-0.002t} + \\ 0.6e^{-0.003t}) \end{bmatrix} \quad (67)$$

and the zone concentrations are not equal except at $t=\infty$ and possibly at $t=0$.

For this example, the system output is $$y(t) = (\tfrac{3}{8}\omega_1(0) + \tfrac{5}{8}\omega_2(0) - \omega_o)e^{-0.002t} + \omega_o \quad (68)$$

and the differential equation describing the input-output relationship is $$\dot{y}(t) + 0.002y(y) = 0.002\omega_o \quad (69)$$

which shows that the input-output description is first-order while the process is second-order.

4. The output cannot be the concentration of any individual zone if the system satisfies the conditions. This is a direct result of Condition 1 because $M_i > 0$ for all $i$. Note that this is not a restriction in the same sense as the restrictions described above because it relates to the location of sensors, or more generally to the design of the measurement system, rather than to the design of the ventilation system itself.

To further illustrate the implications of the above conditions (Equations 58 and 59), consider the following two hypothetical systems. The first system is shown schematically in FIG. 9, while the second system is shown schematically in FIG. 10. Both systems are time-invariant. The first system is ventilated by a supply to each zone and an exhaust from zone 2. The flow direction is reversed in the second system from that of the first system so that the supply is only to zone 2, and there is an exhaust flow from each zone. In both cases, the measurement point is the return concentration. The parameters of the state-variable description of System 1 are $$M_1 = \begin{bmatrix} 20 & 0 & 0 \\ 0 & 60 & 0 \\ 0 & 0 & 30 \end{bmatrix} \quad (70)$$

$$F_1 = \begin{bmatrix} -0.04 & 0 & 0 \\ 0.04 & -0.22 & 0.06 \\ 0 & 0 & -0.06 \end{bmatrix} \quad (71)$$

$$f_{o1} = \begin{bmatrix} 0.04 \\ 0.12 \\ 0.06 \end{bmatrix} \quad (72)$$

and the measurement equation is $$y1(t) = [0 \ 1 \ 0]\omega(t) \quad (73)$$

while the parameters of the state-variable description of System 2 are $$M_2 = \begin{bmatrix} 20 & 0 & 0 \\ 0 & 60 & 0 \\ 0 & 0 & 30 \end{bmatrix} \quad (74)$$

$$F_2 = \begin{bmatrix} -0.04 & 0.04 & 0 \\ 0 & -0.22 & 0 \\ 0 & 0.06 & -0.06 \end{bmatrix} \quad (75)$$

$$f_{o2} = \begin{bmatrix} 0 \\ 0.22 \\ 0 \end{bmatrix} \quad (76)$$

and the measurement equation is $$y2(t) = \begin{bmatrix} \frac{2}{11} & \frac{6}{11} & \frac{3}{11} \end{bmatrix} \omega(t) \quad (77)$$

where the masses are in kilograms and the flow rates are in kilograms per second.

Figure 9:
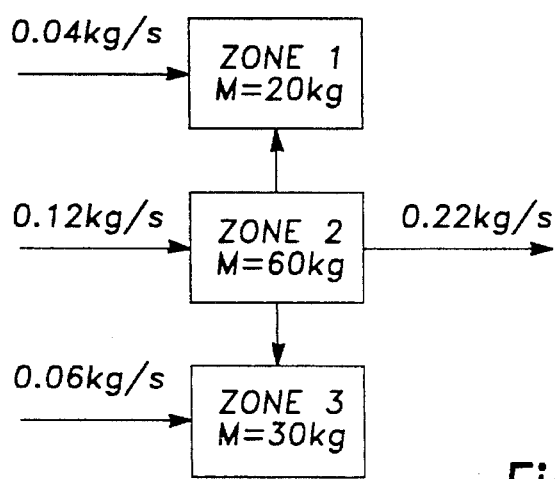
FIG. 9 is a schematic diagram of System 1 where the output is the concentration of zone 2.
Figure 10:
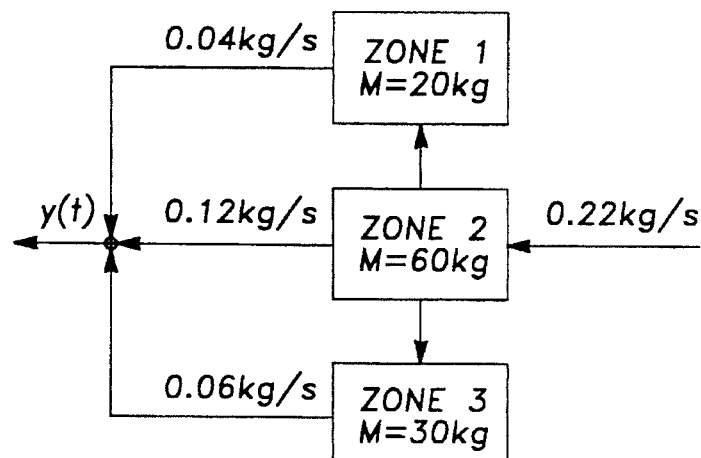
FIG. 10 is a schematic diagram of System 2 where the output is the concentration of the return air, which is a flow-weighted average of the zone concentrations.

By inspection of FIG. 9, System 1 does not satisfy the conditions because there is not an exhaust flow from each zone. Calculations reveal that System 2 does satisfy both conditions (Equations 58 and 59). Thus, by simply changing the direction of the flow, a system that violates the conditions can be made to satisfy them.

To gain further insight into the input-output relationship, suppose that an auxiliary output of System 1 is constructed such that $$y_{aux}(t) = \begin{bmatrix} \frac{2}{11} & \frac{6}{11} & \frac{3}{11} \end{bmatrix} \omega(t) \quad (78)$$

Clearly, Condition 1 is satisfied by $c_{aux}$ because $c_{aux}$ is equal to $c_2$. However, the fact that there is not a return path from each zone indicates that Condition 2 is not satisfied. Differentiating $y_{aux}(t)$ once with respect to time gives $$\dot{y}_{aux}(t) = \frac{022}{110}(\omega_0(t) - \omega_2(t)) + \frac{\Sigma_{i=1}^3 r_i(t)}{110} \quad (79)$$

Since $y1 = \omega2$, $$\dot{y}_{aux}(t) = \frac{0.22}{110}(\omega_o(t) - y_1(t)) + \frac{\Sigma_{i=1}^3 r_i}{110} \quad (80)$$

Equation 80 shows that for System 1, introduction of a third concentration measurement, $Y_{aux}$, in addition to the outdoor air and return air concentrations leads to a first-order differential equation containing the aggregate source strength and the three measurements. This result can be generalized.

The conditions for inducing an input-output description of a multi-zone process which are equivalent to that of a single-zone process are explained above. It is shown that the design condition is too restrictive to be applicable. Conditions for an alternative first-order differential equation relating the aggregate source to the output will now be explained.

Let Equations 45 and 50 describe the transport of a gas species in an N-dimensional, single-output ventilation system. Then under the assumption that there is no exfiltration, the input-output description of the system is $$\dot{y}(t) = \frac{\bar{f}(t)}{\bar{M}}(\omega_o(t) - z(t)) + \frac{1}{\bar{M}}\bar{r}(t) \quad (81)$$

if $$c_i = \frac{M_i}{\bar{M}} \quad (82)$$

where $$\bar{f}(t) = \sum_{i=1}^{N} f_{oi}(t) \quad (83)$$

$$\bar{M} = \sum_{i=1}^{N} M_i \quad (84)$$

$$\bar{r}(t) = \sum_{i=1}^{N} r_i(t) \quad (85)$$

and where z(t) is the return or exhaust concentration.

Since there is no exfiltration, the return concentration is $$z(t) = \frac{\sum_{i=1}^{N} f_{oi}(t)\omega_i(t)}{\sum_{i=1}^{N} f_{oi}(t)} \quad (86)$$

Since Equation 49 implies $$CM^{-1}F(t) = \frac{1}{\Sigma_i^N M_i}[f_{o1}(t) \ldots f_{oN}(t)] \quad (87)$$

then $$cM^{-1}F(t)\omega(t) = \frac{\bar{f}(t)}{\bar{M}} z(t) \quad (88)$$

In this presently preferred embodiment of the invention based on Equation 81, measurements are taken of the concentration of gas in the outgoing air of at least two of the zones in addition to the concentration of gas in the incoming air in at least two of the zones and the concentration of gas in at least two of the zones. By Assumption 1, the mass of air in each zone is assumed to be constant. As expressed in Equation 61, the aggregate mass is either known or estimated. The aggregate flow parameter expressed in Equation 60 is also known or estimated. If the aggregate flow varies with time, it can also be measured.

By comparing Equations 58 and 59 to Equation 82, the design condition is eliminated, but at a cost. There is now a leakage condition, the assumption that there is no exfiltration, and there is an introduction of an additional measurement, z(t). However, this Equation 81 applies to all of the types of systems to which Equation 57 does not apply, assuming that the leakage condition is met. Therefore, in the preferred embodiment of the present invention, Equation 81 is used to estimate the aggregate process and/or source parameters.

Suppose that a control volume is drawn so as to include all of the zones of the multi-zone system. Then Equation 39 can be applied to this aggregate zone as follows $$\dot{m}_{a,z}(t) = w_{a,in}(t) - w_{a,out}(t) + r_a(t) \quad (89)$$

where $\dot{m}_{a,z}(t)$ is the time rate of change of the mass of the gas species in the aggregate zone, $w_{a,in}(t)$ is the mass flow rate of the gas species into the aggregate zone, $w_{a,out}(t)$ is the mass flow rate of the gas species out of the aggregate zone, and $r_a(t)$ is the aggregate source. By the measurement condition, $$\dot{m}_{a,z} = \bar{M}\dot{y}(t) \quad (90)$$

Similarly, $$w_{a,in}(t) = \bar{f}(t)\omega_o(t) \quad (91)$$

$$w_{a,out}(t) = \bar{f}(t)z(t) \quad (92)$$

and by definition $$r_a(t) = \bar{r}(t) \quad (93)$$

Therefore, Equation 81 is a statement of conservation of mass for the aggregate zone when the concentrations are locally uniform. The need for the leakage condition arises because it is necessary to account for all of the gas species that leaves the aggregate control volume.

In the presently preferred embodiment of the invention, a single-sensor instrument is designed for identifying the aggregate parameters of the gas transport in a building which is similar to the previously-described mechanical multiplexer. Any other combination of multiplexing could be used, including sensing the value of y (the mass averaged gas concentration) with multiple sensors then computing an aggregate gas concentration value with an analog circuit or a digital computer.

In gas measurement systems, mechanical multiplexing is common because it reduces the overall cost of the system and because it helps alleviate the undesirable characteristic of drift, or zero errors, to which many gas sensors are prone. If only differences in gas concentration rather than absolute concentrations are needed, then zero errors can be canceled by using one sensor to measure the concentrations of multiple gas streams. When the differences are computed, the zero errors are canceled. Span errors can similarly be canceled if only ratios of concentrations are needed.

In the aforementioned single-zone estimation strategy, a single-sensor multiplexer is used to measure the concentration of each individual zone. As demonstrated above, these individual zone concentrations are not necessary; only the mass-weighted average of the zone concentrations is needed. An instrument can be designed so it samples and averages air from all zones simultaneously in accordance with the condition of Equation 82.

Figure 11:
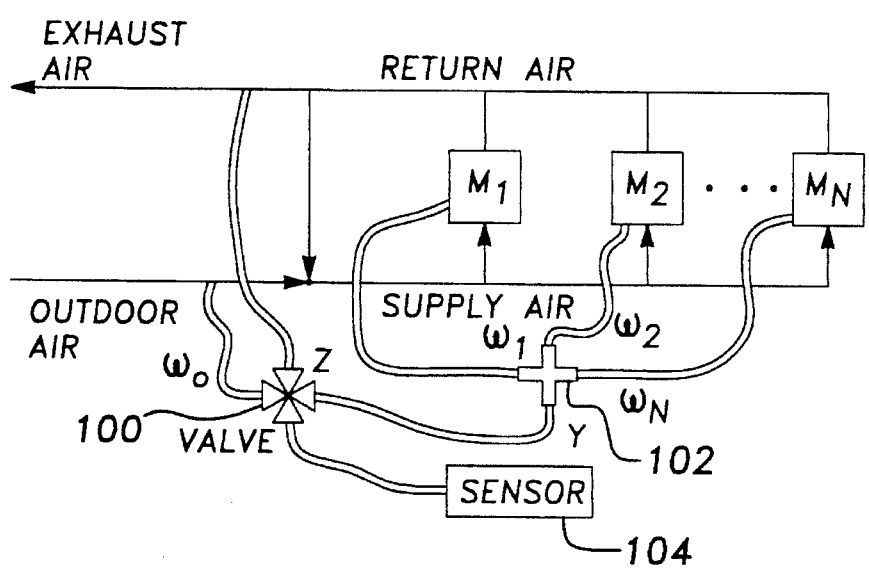
FIG. 11 is a schematic diagram of a single-sensor instrument.

FIG. 11 is a schematic diagram of such an estimation instrument which includes a valve 100, a manifold 102 and a sensor 104. Air is drawn through a tube from each zone such that the ratio of the flow in the $i^{th}$ tube to the flow in all tubes is equal to the ratio of the mass of the $i^{th}$ zone to the mass of all zones. The concentration of this mixture is the value denoted by y which is a flow-weighted average of the zone concentrations determined in the preferred embodiment of the present invention by Equation 81. Valve (multiplexer) 100 switches from y to $w_o$ to z and then repeats the process of measuring the variables. Thus, the gas stream associated with y is sampled at times n, n+3, etc., the gas stream associated with $w_o$ is sampled at times n+1, n+4, etc. and the gas stream associated with z is sampled at n+2, n+5, etc.

Equation 81 is a first-order differential equation which relates aggregate process parameters and aggregate source strength to measurable process variables. The time derivative in the first order differential equation is approximated by a finite difference. As described in the single-zone strategy, system parameters $\bar{M}$ (aggregate mass parameter), $\bar{f}$ (aggregate flow) and $\bar{F}$ (aggregate gas source generation) are estimated using a number of different algorithms such as least squares. The aggregate mass parameter is assumed to be constant, the aggregate flow parameter is either a constant value or sensed if the flow of the system is not constant, and the aggregate source parameter is estimated using mass-weighted averaging based on sensed source concentrations in at least two of the zones of the multi-zone system.

When the gas sources are estimated based on an N-dimensional state equation (N is the number of zones), there are N mass parameters, $N^2+N$ flow parameters, and N sources. Even if the N mass parameters and the N outdoor air flow parameters are known, $N^2$ time-varying internal flow parameters still have to be estimated in addition to the N sources. In contrast, if the output measurement satisfies the conditions of Equation 81, there are only the aggregate mass parameter, the aggregate flow parameter, and the aggregate source. Additionally, the required number of measurements is reduced from N+1 to three. Therefore, the problem is reduced from that of estimating $N^2+N$ time-varying parameters with N+1 measurements to that of estimating two parameters with three measurements. By reducing the number of parameters to be estimated, the multi-zone measurement device with valve 100, manifold 102 and sensor 104 is capable of estimating the aggregate gas source strength without the cost of having a sensor in every zone.

It should be noted that the aforestated aspects of the present invention are not mutually exclusive. Therefore, it is contemplated that building control systems may suitably combine two or more aspects of the present invention based on the specific needs of a given building or enclosure. In addition, it is to be understood that the detailed drawings and specific examples given describe preferred embodiments of the invention and are for the purpose of illustration, that the apparatus of the invention is not limited to the precise details and conditions disclosed, and that various changes may be made therein without departing from the spirit of the invention which is defined by the following claims.

What is claimed is:

1. An apparatus for estimating the rate at which gas is generated in a plurality of zones, comprising:

at least one sensor configured to measure values of selected environmental variables of at least two of the plurality of zones and generate signals representative of the values, the at least one sensor includes means for measuring the concentration of the gas in the incoming air of the at least two zones and the concentration of the gas in the at least two zones; and a gas flow model circuit, operatively connected with the sensors, for receiving the signals from the sensors and generating an estimated gas generation rate value as a function of the values.

2. The apparatus of claim 1 wherein the means for measuring includes a baffle and a manifold for providing a weighted average of the concentration of the gas in the at least two zones.

3. The apparatus of claim 1 wherein the means for measuring includes at least two sensors, wherein each sensor senses the concentration of the gas in one of the at least two zones.

4. The apparatus of claim 1 including means for multiplexing the at least one sensor to sense the concentration of the gas in each of the at least two zones.

5. The apparatus of claim 1 including means for multiplexing the at least one sensor to sense the concentration of the gas in the incoming air of the at least two zones and the concentration of the gas in the at least two zones.

6. The apparatus of claim 1 wherein the gas flow model circuit generates an estimated carbon-dioxide generation rate value based upon the relationships expressed in the equation:

$$\dot{y}(t) = \frac{\tilde{f}(t)}{\overline{M}}(\omega_o(t) - y(t)) + \frac{1}{\overline{M}}\bar{r}(t) \tag{57}$$

where $$\tilde{f}(t) = \sum_{i=1}^{N} f_{oi}(t) \tag{60}$$

$$\overline{M} = \sum_{i=1}^{N} M_i \tag{61}$$

$$\bar{r}(t) = \sum_{i=1}^{N} r_i(t). \tag{62}$$

7. The apparatus of claim 6 wherein the gas flow model circuit generates an estimated carbon-dioxide generation rate value based upon a discrete approximation of the relationships expressed in the equation:

$$\dot{y}(t) = \frac{\tilde{f}(t)}{\overline{M}}(\omega_o(t) - y(t)) + \frac{1}{\overline{M}}\bar{r}(t). \tag{57}$$

8. The apparatus of claim 1 wherein the means for measuring further measures the concentration of the gas in the outgoing air of the at least two zones.

9. The apparatus of claim 8 wherein the means for measuring includes a first sensor for sensing the concentration of the gas in the incoming air of the at least two zones, a second sensor for sensing the concentration of the gas in the at least two zones and a third sensor for sensing the concentration of the gas in the outgoing air of the at least two zones.

10. The apparatus of claim 8 wherein the means for measuring includes at least one sensor multiplexed to sense the concentration of the gas in the incoming air of the at least two zones, the concentration of the gas in the at least two zones and the concentration of the gas in the outgoing air of the at least two zones.

11. The apparatus of claim 8 wherein the means for measuring measures the concentration of the gas in the outdoor air and the concentration of the gas in the exhaust air.

12. The apparatus of claim 8 wherein the means for measuring measures the concentration of the gas in the supply air and the concentration of the gas in the return air.

13. The apparatus of claim 8 wherein the gas flow model circuit generates an estimated carbon-dioxide generation rate value based upon the relationships expressed in the equation:

$$\dot{y}(t) = \frac{f(t)}{M}(\omega_o(t) - z(t)) + \frac{1}{M}r(t) \tag{81}$$

where $$f(t) = \sum_{i=1}^{N} f_{oi}(t) \tag{83}$$

$$M = \sum_{i=1}^{N} M_i \tag{84}$$

$$r(t) = \sum_{i=1}^{N} r_i(t) \tag{85}$$

and where z(t) is the return or exhaust air concentration.

14. The apparatus of claim 13 wherein the gas flow model circuit generates an estimated carbon-dioxide generation rate value based upon a discrete approximation of the relationships expressed in the equation:

$$\dot{y}(t) = \frac{\bar{f}(t)}{\bar{M}} (\omega_o(t) - z(t)) + \frac{1}{\bar{M}} \bar{r}(t). \quad (81)$$

15. The apparatus of claim 1 wherein the means for measuring further measures at least one of the aggregate mass of the air in the at least two zones, and the aggregate flow of the incoming air of the at least two zones.

16. The apparatus of claim 1 wherein the estimated gas generation rate value is an estimated carbon dioxide generation rate value indicative of the aggregate rate at which carbon dioxide is being generated within the plurality of zones.

17. An apparatus for estimating the rate at which gas is generated in a plurality of zones, comprising:
   at least one sensor configured to measure values of selected environmental variables of at least two of the plurality of zones and generate signals representative of the values; and
   a gas flow model circuit, operatively connected with the sensors, for receiving the signals from the sensors and generating an estimated gas generation rate value as a function of the values, the gas flow model circuit generates an estimated carbon-dioxide generation rate value based upon time derivatives of the relationship expressed in the equation:

$$y(t) = C(t)\omega(t)$$

where $C(t)$ is a output distribution matrix and $\omega(t)$ is a mass concentration state vector.

18. A method of estimating the rate at which gas is generated in a plurality of zones, comprising:
   measuring values of selected environmental variables of at least two of the plurality of zones, including the steps of measuring the concentration of the gas in the incoming air of the at least two zones and the concentration of the gas in the at least two zones; and
   generating an estimated gas generation rate value as a function of the values.

19. The method of claim 18 wherein the step of measuring includes the step of obtaining a weighted average of the concentration of the gas in the at least two zones with a sensor, a baffle and a manifold.

20. The method of claim 18 wherein the step of measuring includes the steps of measuring the concentration of the gas in each of the at least two zones.

21. The method of claim 18 wherein the step of measuring includes the step of multiplexing.

22. The method of claim 18 wherein the step of generating includes the step of estimating a carbon-dioxide generation rate value based upon the relationships expressed in the equation:

$$\dot{y}(t) = \frac{\bar{f}(t)}{\bar{M}} (\omega_o(t) - y(t)) + \frac{1}{\bar{M}} \bar{r}(t) \quad (57)$$

where $$\bar{f}(t) = \sum_{i=1}^{N} f_{oi}(t) \quad (60)$$

$$\bar{M} = \sum_{i=1}^{N} M_i \quad (61)$$

$$\bar{r}(t) = \sum_{i=1}^{N} r_i(t). \quad (62)$$

23. The method of claim 22 wherein the step of generating includes the step of estimating a carbon-dioxide generation rate value based upon a discrete approximation of the relationships expressed in the equation:

$$\dot{y}(t) = \frac{\bar{f}(t)}{\bar{M}} (\omega_o(t) - y(t)) + \frac{1}{\bar{M}} \bar{r}(t). \quad (57)$$

24. The method of claim 18 wherein the step of measuring further includes the step of measuring the concentration of the gas in the outgoing air of the at least two zones.

25. The method of claim 24 wherein the step of measuring includes the step of multiplexing.

26. The method of claim 24 wherein the step of measuring includes the step of measuring the concentration of the gas in the outdoor air and the concentration of the gas in the exhaust air.

27. The method of claim 24 wherein the step of measuring includes the step of measuring the concentration of the gas in the supply air and the concentration of the gas in the return air.

28. The method of claim 24 wherein the gas flow model circuit generates an estimated carbon-dioxide generation rate value based upon the relationships expressed in the equation:

$$y(t) = \frac{f(t)}{M} (\omega_o(t) - z(t)) + \frac{1}{M} r(t) \quad (81)$$

where $$f(t) = \sum_{i=1}^{N} f_{oi}(t) \quad (83)$$

$$M = \sum_{i=1}^{N} M_i \quad (84)$$

$$r(t) = \sum_{i=1}^{N} r_i(t) \quad (85)$$

29. The method of claim 28 wherein the step of generating includes the step of estimating a carbon-dioxide generation rate value based upon a discrete approximation of the relationships expressed in the equation:

$$\dot{y}(t) = \frac{\bar{f}(t)}{\bar{M}} (\omega_o(t) - z(t)) + \frac{1}{\bar{M}} \bar{r}(t). \quad (81)$$

30. The method of claim 18 wherein the step of measuring includes the step of measuring at least one of the aggregate mass of the air in the at least two zones, and the aggregate flow of the incoming air of the at least two zones.

31. The method of claim 18 wherein the estimated gas generation rate value is an estimated carbon dioxide generation rate value indicative of the aggregate rate at which carbon dioxide is being generated within the plurality of zones.

32. A method of estimating the rate at which gas is generated in a plurality of zones, comprising:
   measuring values of selected environmental variables of at least two of the plurality of zones; and
   generating an estimated gas generation rate value as a function of the values, including the step of estimating a carbon-dioxide generation rate value based upon time derivatives of the relationship expressed in the equation:

$$y(t) = C(t)\omega(t)$$

where $C(t)$ is a output distribution matrix and $\omega(t)$ is a mass concentration state vector.

33. A building control system, comprising:
   a plurality of sensors disposed to sense values of specified environmental variables in a plurality of zones; and a controller, operatively connected with the plurality of sensors, configured to receive the values from the plurality of sensors and generate control signals responsive to the values, the controller including
an interface circuit operatively connected with the plurality of sensors;
a gas flow model circuit operatively connected with the interface circuit, the gas flow model circuit being configured to receive the values from the plurality of sensors through the interface circuit, the gas flow model circuit being further configured to generate, responsive to the values, an estimated aggregate gas generation rate value representative of the aggregate rate at which carbon dioxide is generated in the zones;
processing and control means, operatively connected with the gas flow model, the processing and control means including a memory, the processing and control means being configured to receive the estimated aggregate gas generation rate value from the gas flow model circuit, to process the estimated gas generation rate value according to instructions stored in memory, compare the estimated aggregate gas generation rate value with a predetermined threshold rate, and to generate the control signals responsive to the estimated aggregate gas generation rate value, one of the control signals indicating the presence of an occupant in the zones when the estimated aggregate gas generation rate value is greater than the threshold rate.

34. The building control system of claim 33 further comprising an alarm operatively connected with the processing and control means, the processing and control means transmitting the control signal to the alarm to activate the alarm when the estimated aggregate gas generation rate satisfies a predetermined criterion.

35. The building control system of claim 33 further comprising a switch for activating a device within the zones, the switch being operatively connected with the processing and control means, the processing and control means transmitting the control signal to the switch to cause the switch to activate the device when the estimated aggregate gas generation rate value is greater than the threshold rate.

36. The building control system of claim 35 wherein the processing and control means transmits a control signal to the switch to cause the switch to deactivate the device when the estimated aggregate gas generation rate value is less than the threshold rate.

37. A building control system, comprising:
plurality of sensors disposed to sense values of specified environmental variables in a plurality of zones; and
a controller, operatively connected with the plurality of sensors, configured to receive the values from the plurality of sensors and generate control signals responsive to the values, the controller including
an interface circuit operatively connected with the plurality of sensors;
a gas flow model circuit operatively connected with the interface circuit, the gas flow model circuit being configured to receive the values from the plurality of sensors through the interface circuit, the gas flow model circuit being further configured to generate, responsive to the values, an estimated aggregate gas generation rate value representative of the aggregate rate at which carbon dioxide is generated in the zones;
processing and control means, operatively connected with the gas flow model, the processing and control means including a memory, the processing and control means being configured to receive the estimated aggregate gas generation rate value from the gas flow model circuit, to process the estimated gas generation rate value according to instructions stored in the memory, to generate the control signals responsive to the estimated aggregate gas generation rate value, and to generate an estimated number of occupants value based on the estimated aggregate gas generation rate value.

38. The building control system of claim 37 further comprising an HVAC system operatively connected with the processing and control means, the processing and control means transmitting the control signals to the HVAC system, the HVAC system controlling specified environmental conditions in the zones in response to the control signals.

39. The building control system of claim 38 wherein the specified environmental conditions include the outdoor flow rate of air from at least two zones, the processing and control means being configured to generate control signals to cause the HVAC to increase the outdoor air flow rate in response to an increase in the estimated number of occupants value, and to decrease the outdoor air flow rate in response to a decrease in the estimated number of occupants value.

40. A building control system, comprising:
a plurality of sensors disposed to sense values of specified environmental variables in a plurality of zones; and
a controller, operatively connected with the plurality of sensors, configured to receive the values from the plurality of sensors and generate control signals responsive to the values, the controller including
an interface circuit operatively connected with the plurality of sensors;
a gas flow model circuit operatively connected with the interface circuit, the gas flow model circuit being configured to receive the values from the plurality of sensors through the interface circuit, the gas flow model circuit being further configured to generate, responsive to the values, an estimated aggregate gas generation rate value representative of the aggregate rate at which carbon dioxide is generated in the zones;
processing and control means, operatively connected with the gas flow model, the processing and control means including a memory, the processing and control means being configured to receive the estimated aggregate gas generation rate value from the gas flow model circuit, to process the estimated gas generation rate value according to instructions stored in the memory, to generate the control signals responsive to the estimated aggregate gas generation rate value, and to estimate a bodily heat production value responsive to a value representative of the number of occupants in the zones and the rate at which carbon dioxide is generated in the zones, the processing and control means being configured to generate the plurality of control signals responsive to the bodily heat production value.

\* \* \* \* \*

UNITED STATES PATENT AND TRADEMARK OFFICE
CERTIFICATE OF CORRECTION

PATENT NO. : 5,550,752
DATED : August 27, 1996
INVENTOR(S) : Clifford C. Federspeil It is certified that error appears in the above-indentified patent and that said Letters Patent is hereby corrected as shown below:

On the Title Page
  Insert the following heading and information:
  --Related U.S. Application Data--
  --Continuation-in-part of Ser. No. 08/202,281, Feb. 25, 1994--.

Column 28, line 51, claim 13

"$y(t) = \frac{f(t)}{M}(\omega_o(t) - z(t)) + \frac{1}{M} r(t)$" should be --$\dot{y}(t) = \frac{\bar{f}(t)}{M}(\omega_o(t) - 2(t)) + \frac{1}{M} \bar{r}(t)$--

Column 28, line 55, claim 13

"$f(t)$-" should be --$\bar{f}(t) =$--

Column 28, line 58, claim 13

"$M =$" should be --$\bar{M} =$--

Column 28, line 61, claim 13

"$r(t)$" should be --$\bar{r}t$--

Column 30, line 24, claim 28

"$y(t) = \frac{f(t)}{M}(\omega_o(t) - z(t)) + \frac{1}{M} r(t)$" should be --$\dot{y}(t) = \frac{\bar{f}(t)}{M}(\omega_o(t) - 2(t)) + \frac{1}{M} \bar{r}(t)$--

UNITED STATES PATENT AND TRADEMARK OFFICE
CERTIFICATE OF CORRECTION

PATENT NO. : 5,550,752            Page 2 of 2

DATED : August 27, 1996

INVENTOR(S) : Clifford C. Federspiel

It is certified that error appears in the above-indentified patent and that said Letters Patent is hereby corrected as shown below:

Column 30, line 28, claim 28

"f(t)-" should be --$\bar{f}(t)$---

Column 30, line 30, claim 28

"M=" should be --$\overline{M}$=---

Column 30, line 33, claim 28

"r(t)" should be --$\bar{r}(t)$--

Signed and Sealed this

Sixteenth Day of December, 1997

Attest:

BRUCE LEHMAN

Attesting Officer      Commissioner of Patents and Trademarks